United States Patent [19]
Hokari

[11] Patent Number: 5,737,216
[45] Date of Patent: Apr. 7, 1998

[54] ROTARY BODY DRIVE CONTROL SYSTEM

[75] Inventor: Norio Hokari, Kanagawa, Japan

[73] Assignee: Fuji Xerox Co., Ltd., Tokyo, Japan

[21] Appl. No.: 422,249

[22] Filed: Apr. 14, 1995

[30] Foreign Application Priority Data

May 9, 1994 [JP] Japan ................... 6-095318

[51] Int. Cl.$^6$ ................... G05B 19/18
[52] U.S. Cl. ............ 364/167.01; 318/685; 364/581
[58] Field of Search ................... 364/167.01, 172,
364/174, 581, 575; 355/200, 296; 318/671,
685, 696, 611, 652, 162, 163

[56] References Cited

U.S. PATENT DOCUMENTS

| | | | |
|---|---|---|---|
| 3,265,870 | 8/1966 | Bose ................... | 364/581 |
| 4,891,588 | 1/1990 | Fujioka et al. ................... | 324/166 |
| 4,926,364 | 5/1990 | Brotherton ................... | 364/581 |
| 4,954,863 | 9/1990 | Harada et al. ................... | 355/51 |
| 5,055,756 | 10/1991 | Ohkoda et al. ................... | 318/618 |
| 5,136,529 | 8/1992 | Makie et al. ................... | 364/581 |
| 5,412,302 | 5/1995 | Kido et al. ................... | 318/685 |
| 5,508,784 | 4/1996 | Matsuoka et al. ................... | 355/200 |

FOREIGN PATENT DOCUMENTS

| | | |
|---|---|---|
| 63-75759 | 4/1988 | Japan. |
| 2-43574 | 2/1990 | Japan. |
| 5-252774 | 9/1993 | Japan. |

*Primary Examiner*—Reba I. Elmore
*Assistant Examiner*—Sheela S. Rao
*Attorney, Agent, or Firm*—Finnegan, Henderson, Farabow, Garrett & Dunner, L.L.P.

[57] ABSTRACT

A rotary body drive control system for controlling the drive of a rotary body used in image devices is disclosed. The control system includes rotation detecting means for detecting a rotation speed of the rotary body, storage means for storing rotation speed information detected by the rotation detecting means when drive means for driving the rotary body for rotation is turned at a fixed speed, for each of the divided segments, and control means for controlling the drive of the rotary body in accordance with rotation speed information that is formed by weighing rotation speed information of the rotation detecting means from the storing means depending on the divided segments, and averaging the weighted rotation speed information.

6 Claims, 16 Drawing Sheets

FIG. 2

|  | SECOND STAGE | THIRD STAGE | MOVING AVERAGE | TRIANGLE |
|---|---|---|---|---|
| 1 |  | 0 |  |  |
| 2 |  | 0.25 |  |  |
| 3 |  | 0.25 |  | 0 |
| 4 |  | 0.25 |  | 0.1 |
| 5 | 0.5 | 0.25 | 0 | 0.2 |
| 6 | 0.5 | 0.5 | 1 | 0.3 |
| 7 | 0.5 | 0.5 | 1 | 0.4 |
| 8 | 0.5 | 0.5 | 1 | 0.5 |
| 9 | 0.5 | 1 | 1 | 0.6 |
| 10 | 0.5 | 1 | 1 | 0.7 |
| 11 | 1 | 1 | 1 | 0.8 |
| 12 | 1 | 1 | 1 | 0.9 |
| 13 | 1 | 1 | 1 | 1 |
| 14 | 1 | 1 | 1 | 0.9 |
| 15 | 1 | 1 | 1 | 0.8 |
| 16 | 0.5 | 1 | 1 | 0.7 |
| 17 | 0.5 | 1 | 1 | 0.6 |
| 18 | 0.5 | 0.5 | 1 | 0.5 |
| 19 | 0.5 | 0.5 | 1 | 0.4 |
| 20 | 0.5 | 0.5 | 1 | 0.3 |
| 21 | 0.5 | 0.25 | 0 | 0.2 |
| 22 |  | 0.25 |  | 0.1 |
| 23 |  | 0.25 |  | 0 |
| 24 |  | 0.25 |  |  |
| 25 |  | 0 |  |  |
| M CONVERSION DATA NUMBER | 11 | 14 | 15 | 10 |

|   | a | b |
|---|---|---|
| 1 | 1 | 1 |
| 2 | 0.5 | 1 |
| 3 | 0.125 | 1 |
| 4 | 0.125 | 1 |
| 5 | 0.125 | 1 |
| 6 | 0.125 | 0.75 |
| 7 | 0.125 | 0.5 |
| 8 | 0.125 | 0.125 |
| AVERAGE NUMBER | 3.5 | 11.75 |

| T1 | T2 | T3 | T4 | T5 | T6 |
|----|----|----|----|----|----|
| T7 | T8 | T9 | T10 | T11 | (OMITTED) |
|    |    |    |    |    |    |

| TL1 | TL2 | TL3 | TL4 | TL5 | TL6 |
|-----|-----|-----|-----|-----|-----|
| TL7 | TL8 | TL9 | TL10 | TL11 | (OMITTED) |
|     |     |     |     |     |     |

| C1 | C2 | C3 | C4 | C5 | C6 |
|----|----|----|----|----|----|
| C7 | C8 | C9 | C10 | C11 | (OMITTED) |
|    |    |    |    |    |    |

ROTARY BODY DRIVE CONTROL SYSTEM

BACKGROUND OF THE INVENTION

1. Field of the Invention

The present invention relates to a rotary body drive control system for controlling the drive of a rotary body, such as a photoreceptor drum, a transfer drum, or the like, in image devices, such as color xerography machines, color printers, and image readers.

2. Description of the Related Art

One of such conventional rotary body drive control systems is disclosed in Japanese Patent Unexamined Publication No. Hei. 63-75759. The rotary body drive control system, used for an image forming apparatus which forms an image on an image bearing member rotating in an endless manner, includes: a stepping motor for driving an image bearing member through a train of reduction gears, a ratio of the numbers of teeth of the reduction gears being expressed by an integer; a memory for storing a pulse generation pattern for neutralizing a rotation variation of one turn of the final gear of the gear train, the amount of the pulse generation pattern corresponding to one turn of the final gear; and detecting means for detecting a home position of the final gear, whereby when the image bearing member is moved, pulses are generated according to the pulse generation pattern, to thereby driving the stepping motor for rotation.

In the rotary body drive control system for the image bearing member, the pulse generation pattern for neutralizing a rotation variation of the image bearing member is previously stored as a fixed pattern in a memory. The control system generates pulses according to the fixed pulse generation pattern from the memory, drives the stepping motor by the generated pulses, thereby neutralizing a rotation variation of the image bearing member. A state of rotation variation of the reduction gear train for driving the image bearing member for rotation changes when ambient conditions, such as temperature, change and by aging after a long use. However, the conventional rotary body drive control system cannot deal with such an accidental rotation variation since the pulse generation pattern for neutralizing the rotation variation of the rotary body is the fixed pattern. Thus, the rotary body drive control system can unsatisfactorily suppress a rotation variation of the image bearing member caused by ambient condition changes, aging, and the like. The resultant image suffers from color out-of-registration.

To solve the above problem, the applicant of the present patent application proposed "a rotation control method and a rotation control device for a multiple-transfer apparatus" in Japanese Patent Unexamined Publication No. Hei. 2-43574. This proposed a rotation control method for a multiple-transfer apparatus for transferring a plural number of images on one transfer roll in a multiple fashion is arranged such that information representative of a variation of an angular speed of the transfer roll when a drive motor for driving the transfer roll is rotated at a fixed angular speed, is stored in advance in storing means, the information on a variation of the angular speed is read out of the storing means at the time of image transfer, and an angular speed of the drive motor is varied on the basis of the information.

Even when an additional rotation variation takes place in the image bearing member as the result of ambient conditions change and aging, this proposed rotation control method for a multiple-transfer apparatus can correct the additional rotation variation as a variation component of the angular speed when variation information of an angular speed of the transfer roll is read out of the storing means, and an angular speed of the drive motor is changed on the basis of the readout variation information. Accordingly, the rotary body drive control system can deal with the rotation variation owing to the ambient conditions change and aging.

The proposed rotation control method for a multiple-transfer apparatus suffers the following problems. In this method, information of a variation of the angular speed of the transfer roll is stored in the storing means as it is, the speed variation information is read out of the storing means, and the angular speed of the drive motor is directly changed on the basis of the readout information. As for the information on a variation of the angular speed of the transfer roll to be stored in the storing means, the number of divided segments of the angular speed is greatly increased in order to improve a control precision of the rotation control of the transfer roll, a variation component by the correction gradually grows into a vibration applying source for a mechanical system ranging from the drive motor through the gear to the rotary shaft of the transfer roll. In an extreme case, the mechanical system oscillates or increases an amplitude of the natural frequency of the mechanical system. Where a high precision of the rotation control of the transfer roll is realized, a high precision encoder is required for the encoder for detecting the information of a variation of the angular speed of the transfer roll. Use of the high precision encoder brings about increase of the costs to manufacture.

The applicant of the present patent application proposed a rotary body drive control system capable of controlling a speed of a rotary body with high precision without any oscillation in the rotary body and increasing the cost, in Japanese Patent Unexamined Publication No. Hei. 5-252774. The proposed rotary body drive control system for controlling a rotary body used in an image forming apparatus includes: first rotation detecting means of a low precision type for detecting a rotation speed of the rotary body; second rotation detecting means of a high precision type for detecting a rotation speed of the rotary body, the second rotation detecting means being used only at the stage of manufacturing color image forming apparatuses; storing means for storing the rotation speed information detected by the first and second rotation detecting means when drive means for driving the rotary body for rotation is driven at a fixed speed, for each of the divided segments of the angular speed; and control means operating such that when an image is formed, the control means detects a rotation speed of the rotary body by the first rotation detecting means, reads the rotation speed information of the first and second rotation detecting means from the storing means, averages rotation speed information detected by the first rotation detecting means and the rotation speed information of the first and second rotation detecting means from the storing means, and controls drive means for driving the rotary body for rotation on the basis of the averaged rotation speed information.

The above-mentioned conventional art has the following technical problems. The technique described in Japanese Patent Unexamined Publication No. 5-252774 varies an angular speed of the drive means on the basis of the rotation speed information from the storing means, in order to reduce a variation of an angular speed of an object to be driven. For a measure to avoid the festering of the mechanical resonance frequency, a "moving averaging process" is used which reads the rotation speed information of the first and second rotation detecting means from the storing means, and successively averages rotation speed information detected by the first rotation detecting means and the rotation speed information of the first and second rotation detecting means from the storing means. Our study showed that use of the moving averaging process amplifies a rotation variation in specific frequencies. That is, it was empirically confirmed that amplifying frequency bands where the input/output ratio takes a negative value is present in the frequency transfer function when the "moving averaging process" is used.

The technique described in Japanese Patent Unexamined Publication No. 5-252774 will further be described. The rotary body drive control system of the publication corrects the output signals from the first and second rotation detecting means according to the following correction formula, and controls the drive of the rotary body for its rotation.

$$f_n = f_s[1 + \alpha\{FILS(1)/T_{ID} - 1\} + \beta\{T_{ID}/(FILD - \Sigma DIFF) - 1\}] \quad (1)$$

where $f_n$: segment frequency after the correction $f_s$: standard frequency previously stored in the storing means FILS (1): interval value computed by averaging the interval values $T_{(N)}$ of the second rotation detecting means for calibration, which are stored as a correction table in the storing means, over the range from a segment (N) to an m number of segments preceding to the segment (N)

FILD: a value computed by averaging the difference $(\Sigma T_{ID} - \Sigma T'_{(N)})$ between an ideal value $\Sigma T_{ID}$ of the segment succeeding to the segment under correction, previously stored in the storing means, and the interval value $\Sigma T'_{(N)}$ read in real time by the second rotation detecting means, over the range from the segment (N) to an m number of segments preceding to the segment (N)

$\Sigma$DIFF: accumulated value computed by averaging the interval values $T_{L(N)}$ and $T_{(N)}$ of the first rotation detecting means and the second rotation detecting means for calibration over the range of the segment (N) and an m number of segments preceding to the segment (N), and accumulating the differences (FILS(2)–FILS (1)) between these averaged values from the 0-phase pulse $T_{ID}$: ideal calculation value for one segment, stored in advance in the storing means, viz., an interval value for one segment in an ideal state that there is no variation in rotation of the rotary shaft of the rotary body $\alpha$: constant in the feed forward part stored in advance in the storing means $\beta$: constant in the feed back part stored in advance in the storing means Thus, the rotary body drive control system is based on the "moving averaging process" which corrects the drive frequency $f_n$ for the rotary body on the basis of the interval value FILS(1), which is computed by averaging the interval values $T_{(N)}$ of the second rotation detecting means for calibration, which are stored as a correction table in the storing means, over the range from a segment (N) to an m number of segments preceding to the segment (N). FIG. 30 is a diagram showing this "moving averaging process".

Let us consider a filter characteristic of the "moving averaging process". In the equation (1), for the value of FILS(1), when data Xn is inputted to the filter, output data Yn thereof can be considered as the result of moving averaging a series of data consisting of memory data X'n corresponding to input data Xn and an m number of data preceding and succeeding to the input data Xn. If an average point number is 15, the output data Yn is expressed by $$Yn = (h_0 X'_{n-7} + h_1 X'_{n-6} + h_2 X'_{n-5} + h_3 X'_{n-4} + h_4 X'_{n-3} + h_5 X'_{n-2} + h_6 X'_{n-1} + h_7 X'_n + h_8 X'_{n+1} + h_9 X'_{n+2} + h_{10} X'_{n+3} + h_{11} X'_{n+4} + h_{12} X'_{n+5} + h_{13} X'_{n+6} + h_{14} X'_{n+7})/15$$

Because of the moving average, the coefficients h are all equal and then h0=h1= ... =h14. Thence, Yn can be rewritten into $$Yn = (\Sigma h_i X'_{n-m}) + 15$$

For $\Sigma$, m=7 to −7. A frequency transfer function H(Z) for the output data Yn is $$H(Z) = (Z^7 + Z^6 + Z^5 + Z^4 + Z^3 + Z^2 + Z^1 + 1 + Z^{-1} + Z^{-2} + Z^{-3} + Z^{-4} + Z^{-5} + Z^{-6} + Z^{-7}) \times h_0/15$$

The frequency response is given, when substituting $ej\omega T$ into Z, $$H(Z) = \{ej7\omega T + ej6\omega T + ej5\omega T + \ldots + 1 + \ldots ej(-6\omega T) + ej(-7\omega T)\} \times h_0/15$$

In the above equation, ejA+ej(−A)=2cosA, and then the frequency transfer function H(Z) is $$H(Z) = (1 + 2\cos 7\omega T + \ldots + 2\cos \omega T) \times h_0/15$$

where

T: sampling period (sec)

ω: angular speed (rad/sec)

e: base of natural logarithm

Its characteristic is graphically shown in FIG. 31.

As seen from the graph, the input/output ratio is approximate to 1 in an extremely low frequency region near to a point where the frequency is 0. Accordingly, when the rotary body is rotated at an equal angular speed, a rotation variation can effectively be reduced in the extremely low frequency region. On the other hand, in high frequency regions where the frequency ranges from 50 to 80 Hz and from 120 to 150 Hz, the input/output ratio takes a negative value. From this fact, it is seen that in these frequency regions, a rotation variation of that frequency component is amplified. Further, it is seen that the filter can effectively reduce the rotation variation in the extremely low frequency region but increases the rotation variation in the high frequency regions, thereby increasing image density irregularity in the high frequencies. Particularly, when a color image is seen by the human eyes, an image irregularity of approximately 1 line/mm is most noisy because of the luminous efficiency of the human eyes. Therefore, it should be avoided that the amplifying character exists in a high frequency region corresponding to the image irregularity of approximately 1 line/mm.

One of the ways to reduce a rotation variation of the rotary body in the high frequency regions is to use high precision gears of class 3 or 4 for driving the rotary body for rotation. Use of the high precision gears leads to great increase of cost to manufacture the apparatus since such gears are expensive.

SUMMARY OF THE INVENTION

The present invention has been made in view of the above circumstances and has an object to provide a rotary body drive control system which creates no oscillation in the rotary body even when a speed control of a rotary body is performed with high precision, effectively reduces at low cost a rotation variation caused in the rotary body in the high frequency regions, and forms an image of high quality, while free from density irregularities.

According to the present invention, there is provided a rotary body drive control system for controlling the drive of a rotary body used in image devices, comprising: rotation detecting means for detecting a rotation speed of the rotary body; storage means for storing rotation speed information detected by the rotation detecting means when drive means for driving the rotary body for rotation is turned at a fixed speed, for each of the divided segments of the angular speed; and control means for controlling the drive of the rotary body in accordance with rotation speed information that is formed by weighing rotation speed information of the rotation detecting means from the storing means depending on the divided segments, and averaging the weighted rotation speed information, when the image device is operated.

In the rotary body drive control system, the control means includes a plural number of adder means, and weights rotation speed information of the rotation detecting means depending on the divided segments and averages the weighted rotation speed information in a manner that the control means adds the rotation speed information of the rotation detecting means in a predetermined number of divided segments by means of the adder means, weights the addition results of the adder means in different ways, and averages the weighted addition results.

The term, "rotary body" includes every kind of rotary body which possibly creates density irregularities in an image during a process for image formation, such as photoreceptor drums, photoreceptor belt drive rolls, medium transfer belt drive rolls, transfer-member transport belt drive rolls, continuous paper transport drive rolls, image reader drive shafts, and ink jet head drive shafts. The rotary body further includes those members indirectly affects an influence on the image formation, such as paper feeders and image fixing units.

The means to divide rotation speed information detected by the rotation detecting means into segmental information may be a means to divide the rotation speed information into segmental information with reference to a home position of the rotary body that is detected by a means for detecting the home position of the rotary body. The home position of the rotary body indicates a reference rotation position of the rotary body. Accordingly, it may be anything if it is capable of producing one output every time the rotary body is turned one time. Further, it may be some thing capable of producing a plural number of outputs from among which a necessary output can be selected. A Z-phase or an index pulse of a stepping motor may be enumerated for the specific means. The rotation detecting means may be a sensor of the optical transmission type or the reflection type, or some means utilizing magnetic, ultrasonic wave, projection, indent or the like, or some means capable of producing a like output in connection with any of these outputs and the output of the rotation angular speed detecting means.

The drive means for driving the rotary body at a uniform angular speed may be an electromagnetic drive means, such as a stepping motor, DC servo motor, AC servo motor, or the like. Any drive means if it can turn the rotary body at a uniform angular speed may be used for the drive means, as a matter of course.

The rotation detecting means for the rotary body may be a general sensor, such as a rotary encoder, tacho generator or the like. Any other means if its output varies in connection with a rotation speed of the rotary body may be used for the rotation detecting means.

The digital memory is generally used for the storing means, but any other means if it can store data may be used.

The control means may be generally a digital signal processor or a microcomputer. In constructing an arithmetic operation unit, the control means with a given function can be realized by software technique. It may be realized by a hardware technique, as a matter of course. In this sense, the digital signal processor and the microprocessor are not limited in their constructive contents.

In the present invention, when the image device is operated, the control means for controlling, depending on the divided segments, the drive state of the rotary body in accordance with rotation speed information formed by weighing rotation speed information of the rotary body detected by the first rotation detecting means, which is corrected depending on the rotation speed information of the rotation detecting means from the storing means, and the rotation speed information of the rotation detecting means, and averaging the weighted rotation speed information. With this construction, during the rotary body drive control operation, if the rotation angular speed of the rotary body varies, the process of the present invention can more reduce the adverse effect from the segments apart from the divided segment under control than the conventional moving averaging process, and further can reduce a rotation variation in high frequency regions, which is increased in the conventional moving averaging variation since the drive state of the rotary body is controlled in accordance with rotation speed information formed by weighing, depending on the divided segments, rotation speed information of the rotation detecting means which is corrected depending on the rotation speed information of the rotation detecting means from the storing means, and averaging the weighted rotation speed information.

BRIEF DESCRIPTION OF THE DRAWINGS

The accompanying drawings, which are incorporated in and constitute a part of this specification, illustrate (an) embodiment (s) of the invention and, together with the description, serve to explain the objects, advantages and principles of the invention. In the drawings.

FIG. 2 is a table showing a window function used in a control means in the rotary body drive control system;

DETAILED DESCRIPTION OF THE PREFERRED EMBODIMENTS

The preferred embodiments of the present invention will be described with reference to the accompanying drawings.

Figure 1:
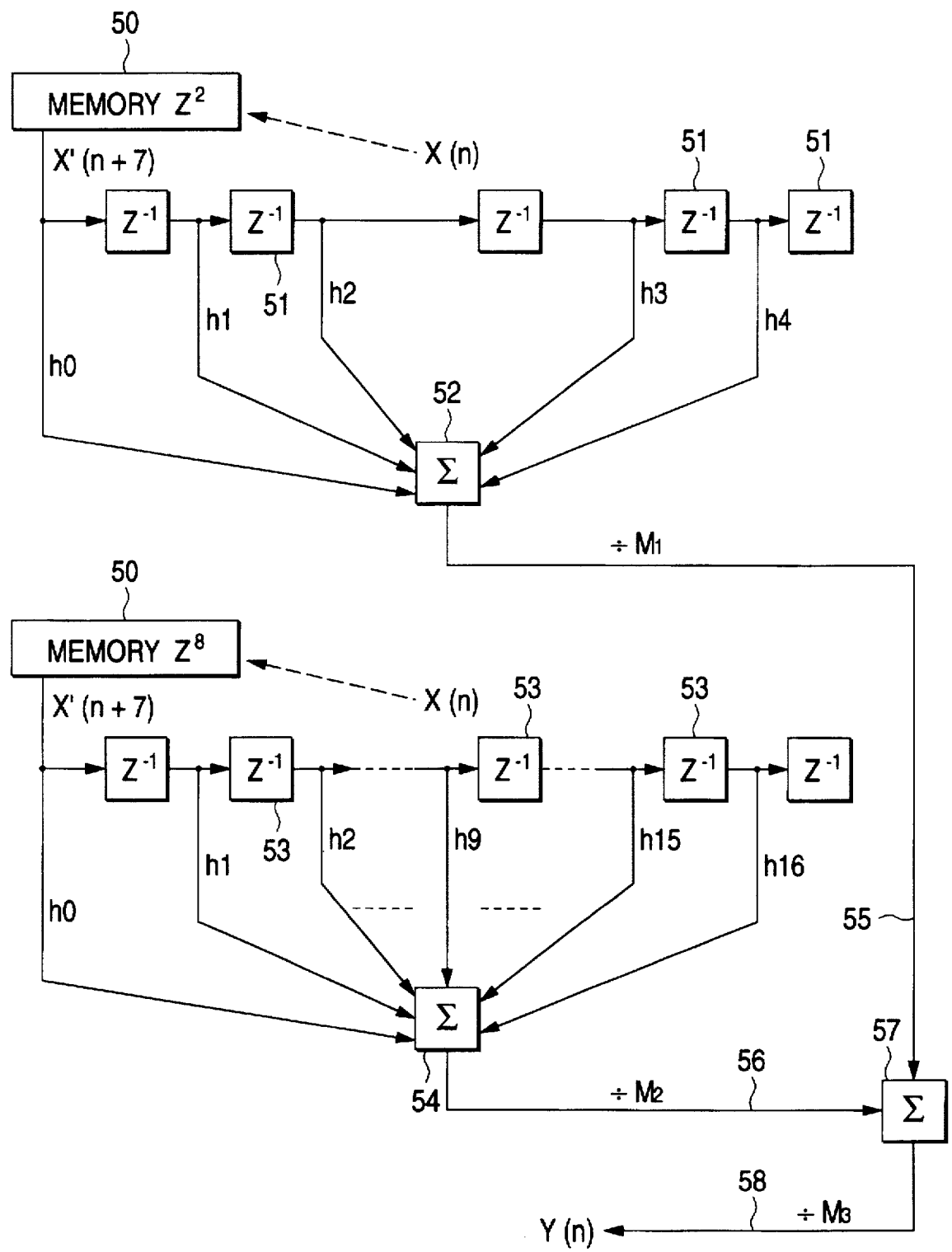
FIG. 1 is a diagram showing a control operation showing a rotary body drive control system according to an embodiment of the present invention.
Figure 3:
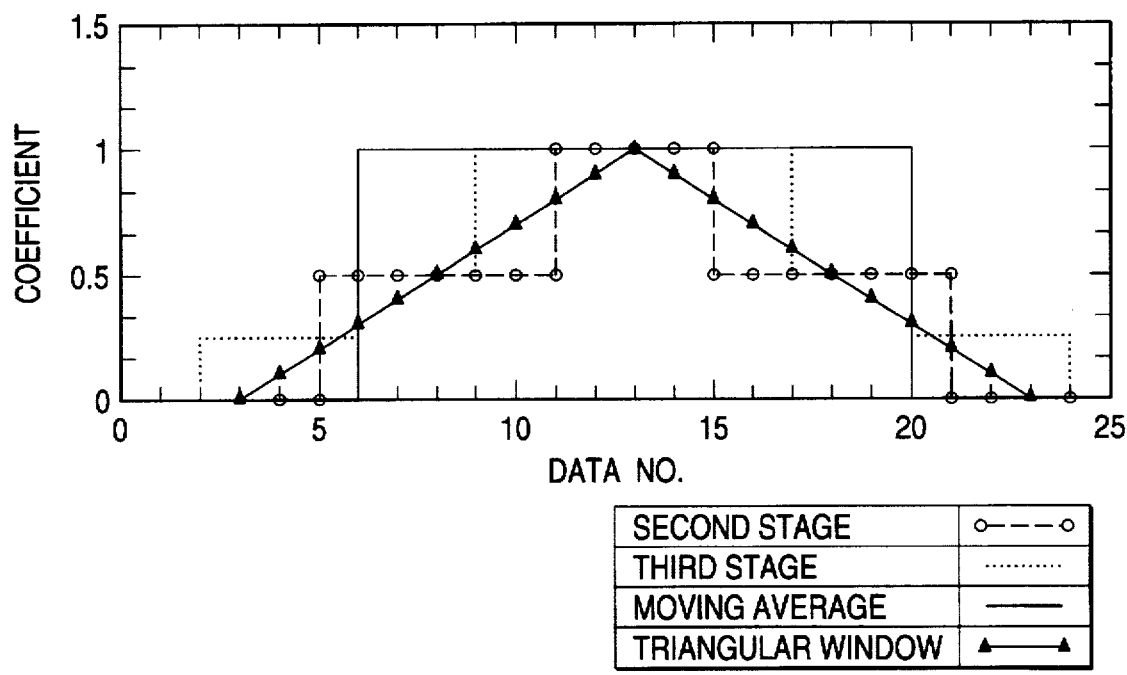
FIG. 3 is a graph showing the window function used in a control means in the rotary body drive control system.

First, the operation of the present invention will be described. In the description to follow, the control means includes two adders, as shown in FIG. 1, and the weighing by a two-stage filter as shown in FIGS. 2 and 3 is carried out by the adders.

The characteristic of the two-stage filter may mathematically be described in the following. For an input X(n) to the filter, an output Y (n) is expressed by $$Y(n) = \frac{1}{2} \times (\Sigma X'_{(n-k)}) + \frac{1}{2} \times (\Sigma X'_{n-m})$$

In the above equation, for $\Sigma$, $k = -2$ to $+2$, and $m = -8$ to $+8$. The output signal Y(n) is averaged by dividing the whole Y(n) by a given coefficient, not shown.

The equation describes the sum of two moving averaging filters. Then, let us analyze the first term of the equation. The first term is $$Y1(n) = (\frac{1}{2}) \times (\Sigma X'_{(n-k)})$$

The frequency transfer function H(Z) of this is $$H(Z) = (\frac{1}{2}) \times (Z^2 + Z^1 + 1 + Z^{-1} + Z^{-2}); h0 = \frac{1}{2}$$

The frequency response is given, when substituting $e^{j\omega t}$ into Z, $$H(n) = (\frac{1}{2}) \times (\cos(2\omega t) + \cos(\omega t) + 1)$$

Similarly, the second term of the equation is $$Y2(n) = (\frac{1}{2}) \times (\Sigma X'_{(n-m)}); h0 = \frac{1}{2}$$

Here, for $\Sigma$, $m = -8$ to $8$. The frequency transfer function H(Z) is given $$H(Z) = (\frac{1}{2}) \times (Z^8 + Z^7 + Z^6 + Z^5 + Z^4 + Z^3 + Z^2 + Z^1 + 1 + Z^{-1} + Z^{-2} + Z^{-3} + Z^{-4} + Z^{-5} + Z^{-6} + Z^{-7} + Z^{-8})$$

The frequency response is given, when substituting $e^{j\omega t}$ into Z, $$H(n) = (\frac{1}{2}) \times (\cos(8\omega t) + \ldots + \cos(\omega t) + 1)$$

Thence, the final transfer function is $$Y(n)/X(n) = H(n) = (\frac{1}{2}) \times (\cos(8\omega t) + \ldots + 2\cos(2\omega t) + 2\cos(\omega t) + 2)$$

Figure 4:
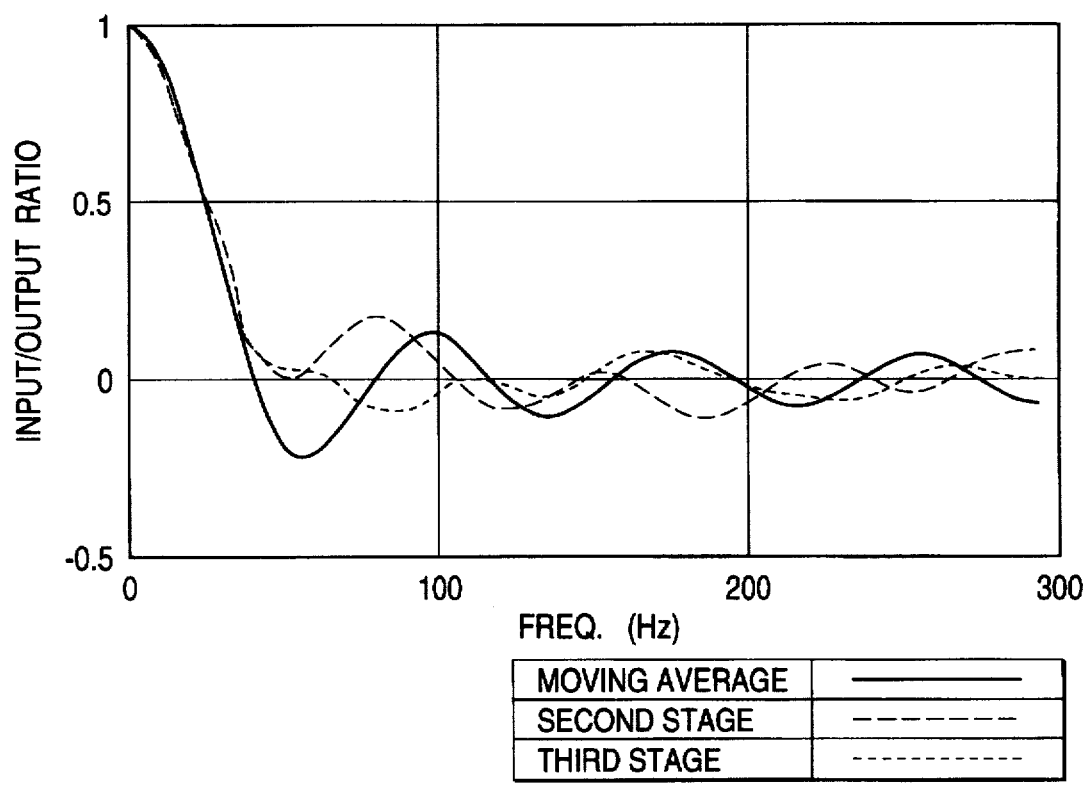
FIG. 4 is a graph showing a filter characteristic of the window function used in a control means in the rotary body drive control system.

A graphical representation of the frequency transfer function of the two-stage filter is as shown in FIG. 4. As seen from FIG. 4, in this filter, the input/output ratio does not take a minus value in the high frequency region from 50 to 80 Hz. Therefore, a rotation variation in the high frequency region is not amplified. Further, a variation of the input/output ratio is minimized in other high frequencies. Thus, the rotation variation can be reduced while it is increased in the conventional process.

Figure 7:
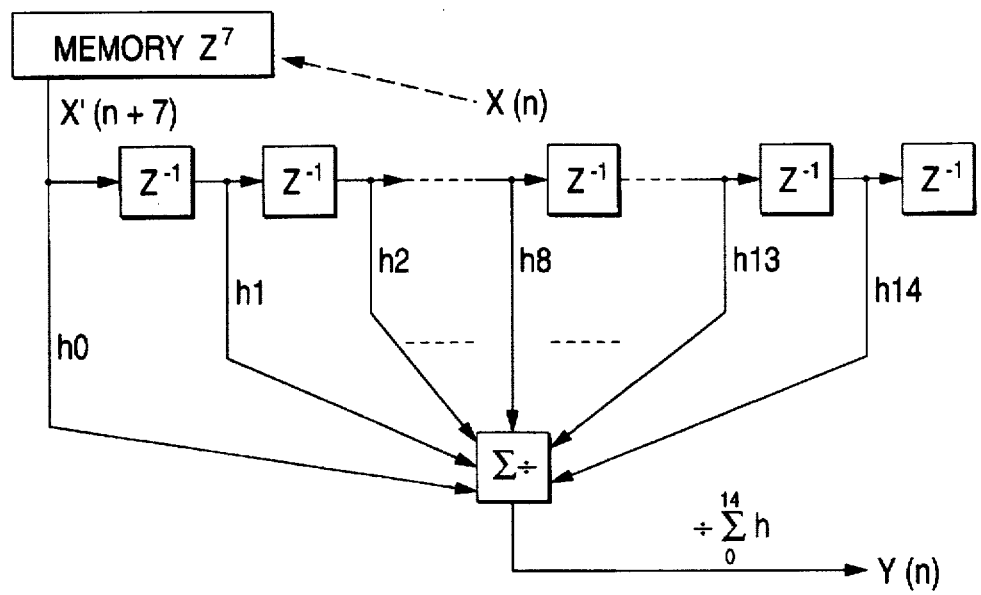
FIG. 7 is a diagram showing a control operation when a triangle window function is used.
Figure 8:
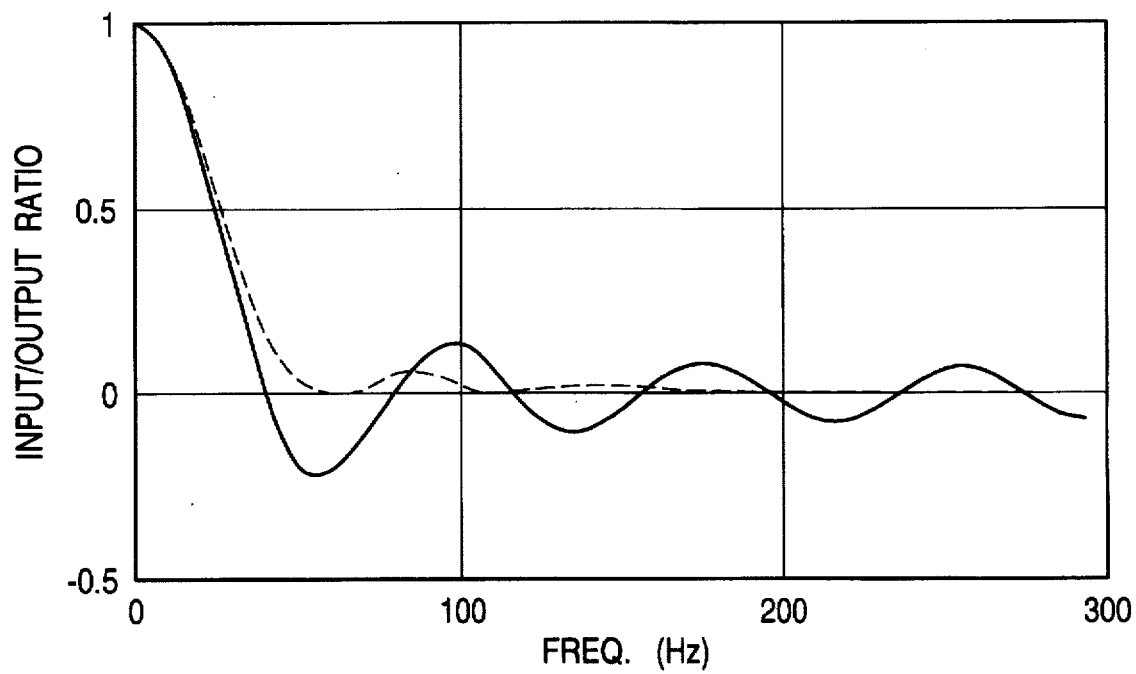
FIG. 8 is a graph showing a filter characteristic of the window function used in the control means.

A triangle window filter having characteristics as shown in FIGS. 2 and 3 may be used for the filter for weighing and averaging the rotation speed information. In this case, a diagram to realize this is as shown in FIG. 7, and its filter characteristic is excellent as shown in FIG. 8.

Figures 5, 6:
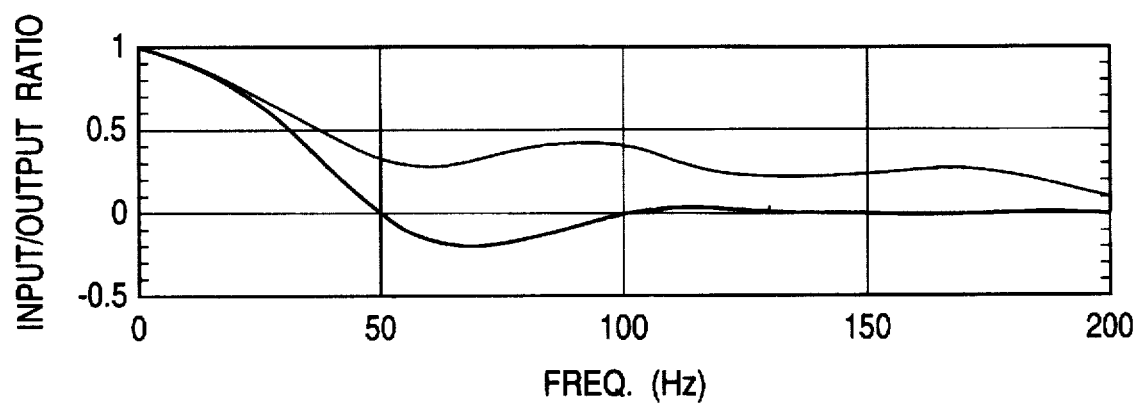
FIG. 5 is a table showing a window function used in a control means in the rotary body drive control system.
FIG. 6 is a graph showing a filter characteristic of the window function used in a control means in the rotary body drive control system.

As described above, the rotary body drive control system of the present invention is arranged so as to control the drive of the rotary body on the basis of the rotation speed information formed by weighing the rotation speed information of the second rotation speed means depending on the divided segments and averaging the weighted rotation speed information. Accordingly, the rotation speed information of the second rotation detecting means is weighted in multiple steps and averaged. An example of the window function for weighing the information in multiple steps and averaging the result is shown in FIGS. 5 and 6. The window function accepts a proper constant. Therefore, the filter characteristic thereof may be considerably altered. The method for obtaining the filter characteristic is as described above. The features required for the filter characteristic has a close relation with the characteristic of the system. The required features are: 1) not to amplify the resonance point of the system under control and 2) to attenuate generated frequencies. Therefore, it is essential to obtain the filter characteristic and the window function, which can satisfy the above requirements. An additional essential point in design is to carry out the arithmetic operation for the shortest time, allowing for the arithmetic operation time of the control means. In the control based on the discrete sampling, the time intervals for the control possibly cause control errors. In this respect, the shortest control intervals are desirable.

For more details of those requirements, 1) the input/output ratio in the filter characteristic is substantially 0 in the frequency band of the resonance region. 2) The input/output ratio in the filter characteristic is closer to 1 in the low frequency region to be controlled. 3) The input/output ratio in the filter characteristic is substantially 0 in the high frequency region to be controlled. 4) The coefficient of the window function is $½^2$. 5) The number of filter stages is reduced as small as possible. The reason for this follows. When the coefficient is $½^2$, a similar result is obtained with an n-bit shift instruction, when considering a case that a software is described in a program language, such as the assembler. When comparing with a division of a series of numbers containing several numerals to the left of the decimal (e.g., 0.23456), the arithmetic operation time is much shorter. As the number of filer stages increases, the software contents proportionally increases and the processing time also increases. Therefore, it desirable to select the best window function after carefully studying several candidate patterns.

Figure 9:
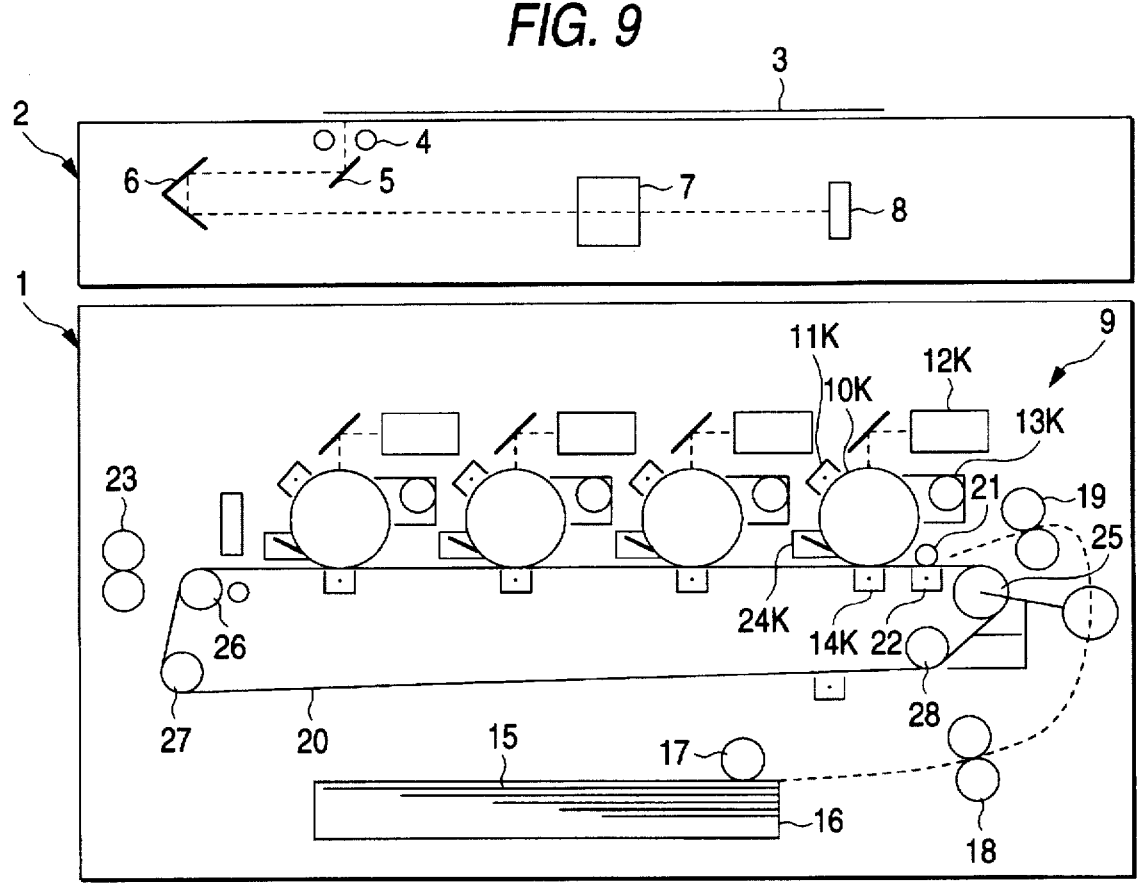
FIG. 9 is a view showing an embodiment of a color image forming apparatus into which a rotary body drive control system according to the present invention is incorporated.

FIG. 9 is a view showing an embodiment of a color image forming apparatus into which a rotary body drive control system according to the present invention is incorporated.

In FIG. 9, reference numeral 1 designates a color image forming apparatus, and an image reader 2 for reading an image on an original document is located above the color image forming apparatus 1. In the image reader 2, an image on an original document 3 is illuminated with light emitted from a light source 4. Light reflecting by the original document 3 contains information of the image on the original document. The reflecting light beam travels through a route of a plural number of mirrors 5 and 6 and a lens 7, and reaches a CCD sensor 8. The reflecting light beam moves across the CCD sensor 8. As a result, the CCD sensor 8 reads the original image contained in the reflecting light beam.

A color image forming unit 9 for forming a color image of the original image that is read by the image reader 2 is disposed within the color image forming apparatus 1. The construction of the color image forming unit 9 follows.

In FIG. 9, 10K, 10Y, 10M and 10C designate photoreceptor drums. Toner images of black, yellow, magenta and cyan are formed on the surface of the photoreceptor drums 10K, 10Y, 10M and 10C. The photoreceptor drums 10K, 10Y, 10M and 10C are disposed side by side at predetermined distances thereamong. The surfaces of the photoreceptor drums 10K, 10Y, 10M and 10C are uniformly charged by primary chargers 11K, 11Y, 11M and 11C, and successively exposed to light beams containing color original images, which are applied from exposure optical systems 12K, 12Y, 12M and 12C. As a result, latent electrostatic images are formed on the surfaces of the photoreceptor drums 10K, 10Y, 10M and 10C. These latent electrostatic images thus formed are developed into visual color toner images of black, yellow, magenta and cyan by developing units 13K, 13Y, 13M and 13C. These toner images are successively transferred onto a recording paper 15 by transfer/charger units 14K, 14Y, 14M and 14C, respectively.

The recording paper 15, which will successively receive the color toner images from the photoreceptor drums 10K, 10Y, 10M and 10C, is fed from a paper cassette 16 by a paper feed roll 17, and transported to a transfer-member transport belt 20 by the cooperation of a transport roll 18 and a register roll 19. In this case, the recording paper 15 is transported in a state that it is electrostatically held on the transfer-member transport belt 20 by the cooperation of a pressure roll 21 and a charger 22. The recording paper 15 thus transported reaches transfer positions under the photoreceptor drums 10K, 10Y, 10M and 10C. The recording paper 15, which successively received the toner images from the photoreceptor drums 10K, 10Y, 10M and 10C, is separated from the transfer-member transport belt 20, and transported to a fixing unit 23. The fixing unit 23 fixes the those color toner images on the recording paper 15 in a superimposed fashion.

After the image transfer process ends, the photoreceptor drums 10K, 10Y, 10M and 10C reach cleaning units 24K, 24Y, 24M and 24C. The cleaning units 24K, 24Y, 24M and 24C remove toner left on the surfaces of the photoreceptor drums 10K, 10Y, 10M and 10C. Then, the surfaces of the photoreceptor drums 10K, 10Y, 10M and 10C are discharged by a discharger and an erasing lamp, both not shown, and ready for the next color image forming process.

In the instant embodiment, the transfer-member transport belt 20, made of PET (polyethylene terephthalate), is 75 μm thick, 340 mm wide, and 1920 mm long (circumferential length). The transfer-member transport belt 20 is put on a drive roll 25, and a plural number of follower rolls 26, 27 and 28 while being stretched at a tension of 5 Kgf. The belt 20, when driven by the drive roll 25, turns at a moving speed of 160 mm/sec.

Figure 10:
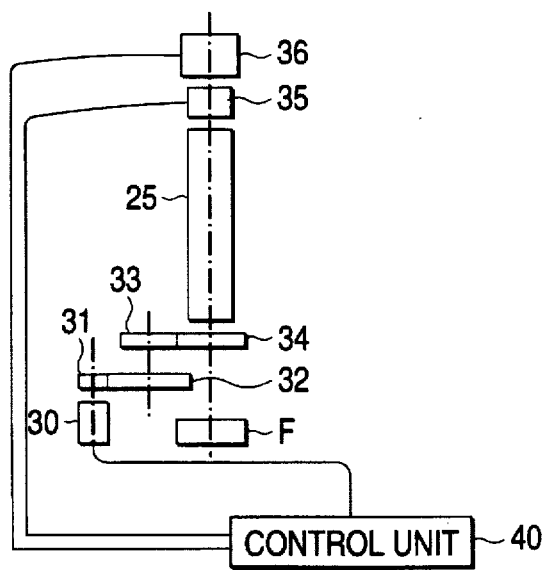
FIG. 10 is a view showing a drive mechanism for driving a transfer-member transport belt to turn.

FIG. 10 shows a drive mechanism for driving the transfer-member transport belt 20 for turn.

In the figure, the drive roll 25, which is used for driving the transfer-member transport belt 20 to turn, is driven by a mechanism including a drive motor 30 as a 2-phase stepping motor, a first gear 31 fastened to a drive shaft of the drive motor 30, a second gear 32 in mesh with the first gear 31, a third gear 33 fastened to the same shaft of the second gear 32, and a drive gear 34 fastened to the rotary shaft of the drive roll 25, which is in mesh with the third gear 33. A flywheel as an inertia body, if necessary, is attached to the rotary shaft of the drive roll 25. The drive motor 30 as the 2-phase stepping motor rotates at the speed of 19.6 revolutions/sec. while being driven at the fundamental drive frequency of 3,920 Hz. The drive motor 30 drives the drive roll 25 for turn at a reduction rate of $¹⁄_{12}$. As a result, the transfer-member transport belt 20 is turned at a moving speed of 160 mm/sec. by the drive roll 25.

A rotary encoder 35 as a first turn detecting means and a rotary encoder 36 for calibration as a second turn detecting means are attached to the rotary shaft of the drive roll 25. The rotary encoders 35 and 36 are used for detecting an angular speed of the drive roll 25. The rotary encoders 35 and 36 are connected to a control unit 40, which is connected to the drive motor 30. The rotary encoder 35, which is of a relatively low precision type, produces 180 or 360 pulses per turn, for example. The calibration rotary encoder 36, which is of a relatively high precision, produces over ten thousands pulses per turn. The calibration rotary encoder 36 is attached to the rotary shaft of the drive roll 25 when the color image forming apparatus is adjusted in factory, and is removed therefrom before it is delivered.

Figure 11:
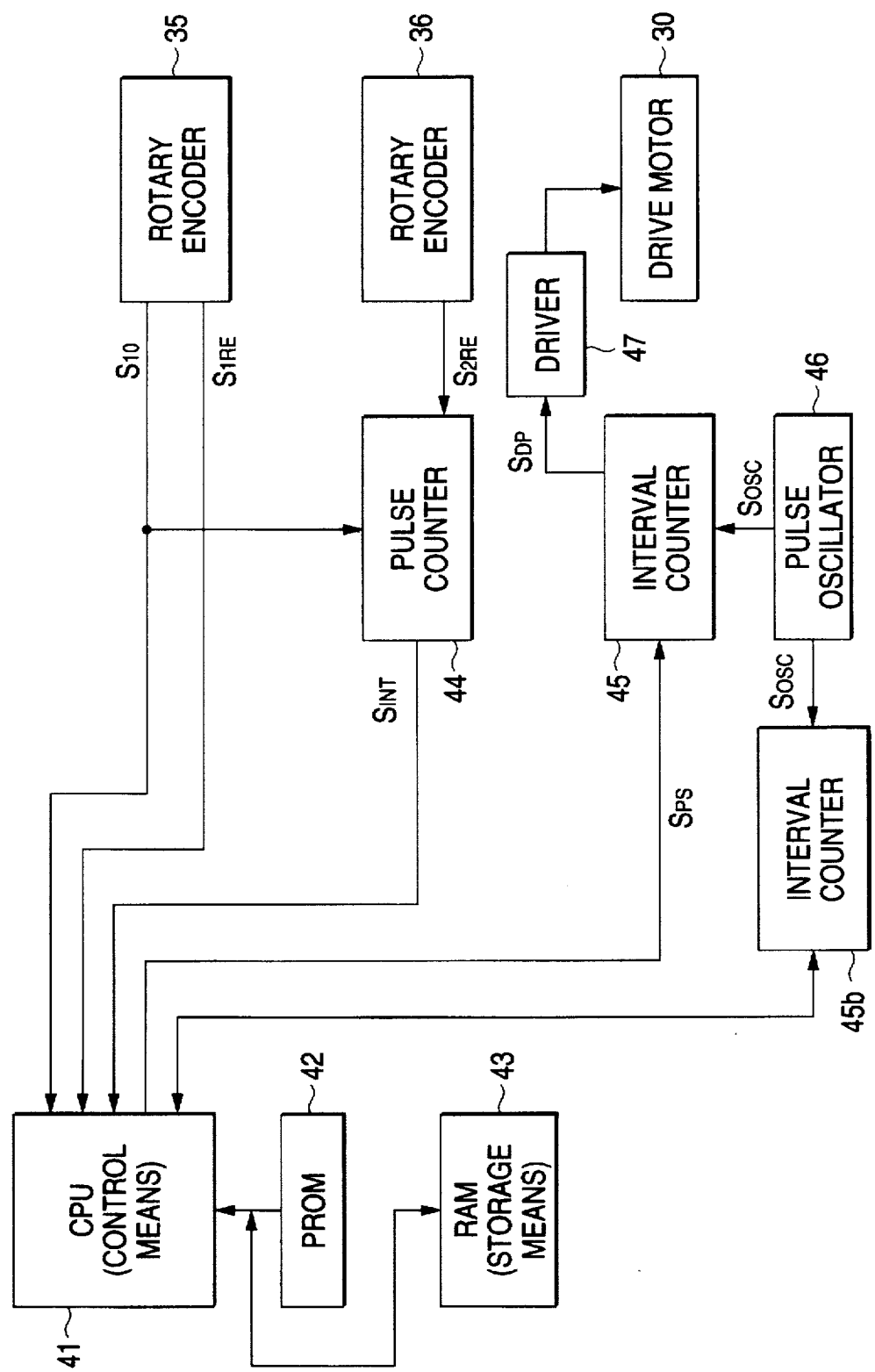
FIG. 11 is a block diagram showing a control unit contained in the color image forming apparatus of FIG. 9.

The circuit arrangement of the control unit 40 contained in the color image forming apparatus of the present embodiment is shown in FIG. 11.

In the figure, reference numeral 41 designates a CPU (central processing unit) for controlling the operation to drive the transfer-member transport belt 20; 42, a PROM (programmable read only memory) for storing programs to be executed by the CPU 41, preset data, and the like; 43, a RAM for storing time intervals for divided segments of angular speed information gathered by the rotary encoder 35 and the calibration rotary encoder 36; 35, the rotary encoder for detecting the rotating speed of the transfer-member transport belt 20 in an image recording mode; 36, the calibration rotary encoder for calibrating the rotary encoder 35, which is used for the adjustment before its delivery; 44, a pulse counter for dividing the frequency of a pulse signal output from the calibration rotary encoder 36; 45, an interval counter for outputting a drive pulse at a predetermined instruction frequency, which is formed by dividing the frequency of the output pulse signal of a pulse oscillator 46; and 47, a drive-motor driver for turning the drive motor 30 in accordance with a drive pulse signal outputted from the interval counter 45.

Figure 12:
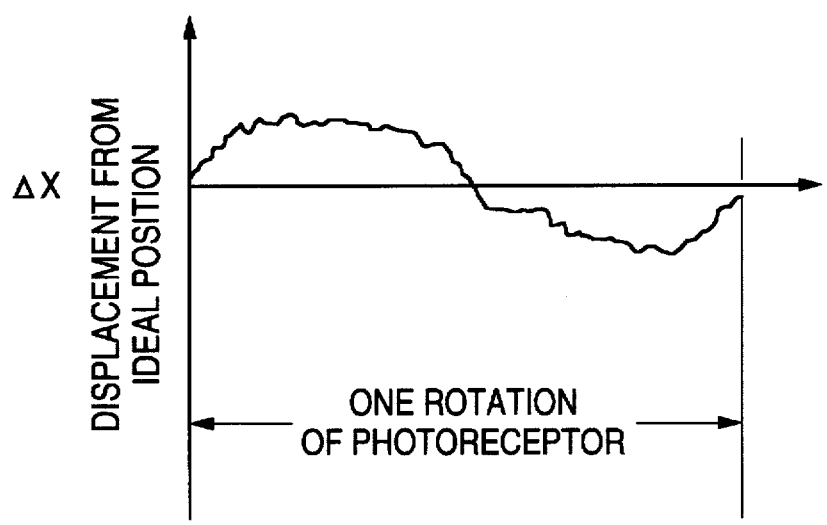
FIG. 12 is a graph showing a rotation variation of a drive roll.

Before the drive control according to the present embodiment, the drive mechanism for the transfer-member transport belt 20 causes a speed variation corresponding to one turn of the drive roll 25 and its harmonics to be generated in the transfer-member transport belt 20 even if an instruction frequency to the drive motor 30 for driving the transfer-member transport belt 20 for turn is set at a fixed frequency. Further, it generates a speed variation component corresponding to the number of teeth of the final gear 34. Generation of these speed variations and harmonics are inevitable for actual mass production products because the tooth of the final gear 34 is not profiled in the form of a perfect involute curve, the centers of rotation of the final gear 34, the drive roll 25, and the drive motor 30 are not coincident with the substantial geometrical centers for the their drive. These arise from a variation of the dimensions of the component parts when these are manufactured and assembled. These speed variation components, as shown in FIG. 12, are measured in the form of a variation of the pulse intervals of a pulse signal outputted from each of the rotary encoders 35 and 36, attached to the rotary shaft of the drive roll 25, and sampled. Normally, it is observed in a state that the frequency of approximately 588 Hz varies at 10% p—p.

Figure 13:
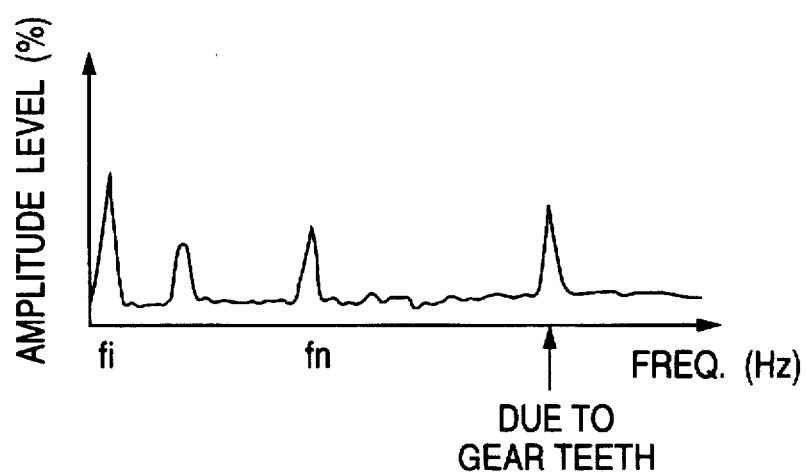
FIG. 13 is a graph showing a variation of a frequency component of the rotation variation of the drive roll.

Generally, the relationship between a variation of the angular speed of rotation of the transfer-member transport belt 20 and a position error is mathematically expressed by the following equations (2). In the equations, a position error X (t) is integrated in the range from 0 to t.

$$\omega(t)=\omega 0+\Delta\omega_f \cos \omega_f t+\Delta\omega_j \cos \omega_j t+\ldots \ X(t)=\int \omega(t)dt=\omega_0 t+(\Delta\omega_1/\omega_1) \sin \omega_1 t+\ldots +(\Delta\omega/\omega_j) \sin \omega_j t+\ldots \quad (2)$$

where $\omega 0$: average angular speed at the shaft of the photoreceptor $\Delta\omega_j$: angular speed oscillation at the oscillation frequency fi fi : oscillation frequency X(t) : rotation angle The result of fast Fourier transforming an angular speed of the drive roll 25, which is for driving the transfer-member transport belt 20 for turn, is as shown in FIG. 13.

As shown, before the drive control for the transfer-member transport belt 20, peaks of the amplitude appear at points near to the frequency $f_i$, the resonance frequency $f_n$ of the system, and high frequencies owing to the drive gear. The variation of the rotation angular speed of the transfer-member transport belt 20 appear in the form of color out-of-registration and color irregularity in the color images, which are successively transferred onto a recording paper 25.

The variation of the angular speed of the transfer-member transport belt 20 contains a variation of low frequencies of an eccentric component generated at periods each equal to one turn of the drive roll 25, a variation of the intermediate frequency corresponding to the resonance frequency $f_n$ of the system, a variation high frequencies caused by the drive gear, and the like.

In the adjustment of the apparatus in factory before it is delivered, the calibration rotary encoder 36 is attached to the rotary shaft of the drive roll 25, in addition to the rotary encoder 35. A correction table as given below is formed. The work to form the correction table for the transfer-member transport belt 20 will be described below.

To form the correction table for the transfer-member transport belt 20, the transfer-member transport belt 20 is turned at a fixed angular speed. As shown in FIG. 11, a pulse signal $S_{OSC}$ of the pulse oscillator 46 is frequency divided into a drive pulse signal $S_{DP}$ at a preset frequency by the interval counter 45. The drive pulse signal $S_{DP}$ is applied to the drive motor 30 for driving the pulse oscillator 46. The frequency of the drive pulse signal $S_{DP}$ is stored as a standard frequency $f_S$ in advance in the PROM 42. The CPU 41 reads the data of the standard frequency fs from the PROM 42, and loads the data as preset data $S_{PS}$ into the interval counter 45. The interval counter 45 counts a pulse signals outputted from the pulse oscillator 46, and produces a drive pulse signal $S_{DP}$ every time the count reaches the preset data $S_{PS}$. The transfer-member transport belt 20 is rotated by the drive pulse signal $S_{DP}$ of the standard frequency $f_S$, which is applied through the drive-motor driver 47 to the drive motor 30.

Figure 14A:
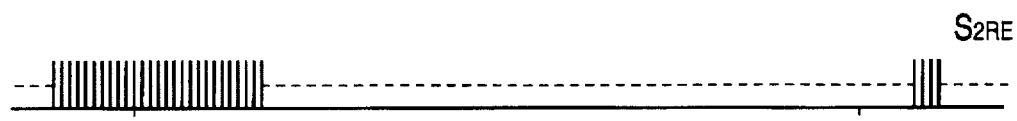
FIGS. 14A to 14E are timing charts showing an operation of the control section in the rotary body drive control system.
Figure 14B:
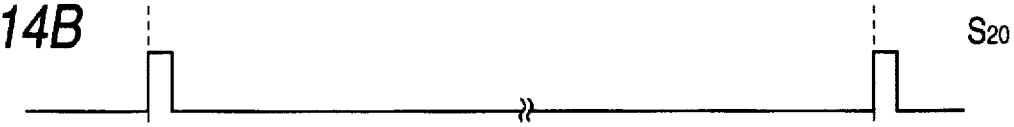
Figure 14C:
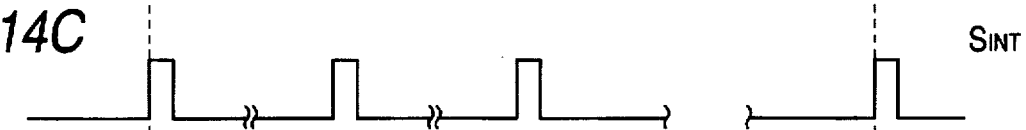
Figure 14D:
Figure 14E:
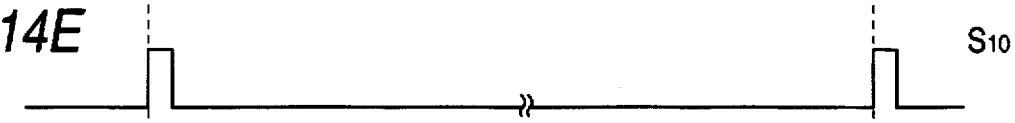

With rotation of the drive roll 25 for driving the transfer-member transport belt 20 for turn, the rotary encoders 35 and 36 which are mounted on the rotary shaft of the drive roll 25 output pulse signals $S1_{RE}$ and $S2_{RE}$ and a 0–φ pulse signal $S1_0$ to the CPU 41, as shown in FIGS. 14(a), 14(b) and 14(c). In this case, the pulse signal $S2_{RE}$ outputted from the calibration rotary encoder 36 is outputted to the CPU 41 by way of the pulse counter 44. The pulse signals $S1_{RE}$ and $S2_{RE}$ are outputted every time the rotary encoders 35 and 36 are turned at a preset angle. The 0–φ pulse signal $S1_0$ is produced when the rotary encoder 35 is at a home position after one turn of its rotation. The same position is used for the reference positions of the rotary encoders 35 and 36. The pulse counter 44 frequency divides the pulse signal $S2_{RE}$ outputted from the calibration rotary encoder 36 into an interrupt signal $S_{INT}$ which in turn is applied to the CPU 41.

During the formation of the correction table, a rotation variation of the drive roll 25 is detected by the rotary encoders 35 and 36. The pulse signals $S1_{RE}$ and $S2_{RE}$ from the rotary encoders 35 and 36 are produced at fixed time intervals if there is no rotation variation of the drive roll 25. Accordingly, the number of pulses produced for a preset interval of time is always constant. However, if the drive roll 25 varies in rotation, the pulse signals $S1_{RE}$ and $S2_{RE}$ from the rotary encoders 35 and 36 are produced at varying time intervals. The number of outputted pulses varies for each interval of time as shown in FIG. 14.

The CPU 41 reads a count of an interval counter 45b every time it receives an interrupt signal $S_{INT}$, which is formed by frequency dividing the pulse signal $S2_{RE}$ of the calibration rotary encoder 36 by the pulse counter 44. The interval counter 45b is driven by the output signal of the pulse oscillator 46. And the CPU 41 stores the readout count into the RAM 43. To be more specific, after the CPU 41 receives a 0–φ pulse signal $S1_0$ from the calibration rotary encoder 36, when it is interrupted by a first interrupt signal $S_{INT}$, the interval counter 45 reads a count of an interval 47b, and stores into the RAM 43 the count as an interval T1 corresponding to the first divided segment. When receiving an interrupt signal $S_{INT}$ corresponding to the next divided segment, the CPU 41 similarly reads a count of the interval counter 47b and calculates the difference between the present count and the previous count, to thereby measure the interval T2 of that segment and store it into the RAM 43. This operation is repeated for one period of the calibration rotary encoder 36.

At this time, the 0–φ pulse signal $S2_0$ from the calibration rotary encoder 36 has been supplied to the CPU 41. An initial value of the address is set by the CPU 41 using the 0–φ pulse signal $S2_0$ as a reference. Subsequently, every time it receives the interrupt signal $S_{INT}$, the CPU 41 stores the interval $T_{(N)}$ for each segment into the RAM 43.

Figures 15, 16, 17, 18:
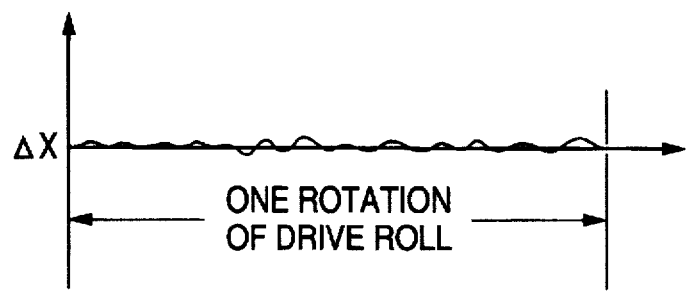
FIG. 15 is a table showing data gathered by a calibration rotary encoder in the rotary body drive control system.
FIG. 16 is a table showing data gathered by a rotary encoder in the rotary body drive control system.
FIG. 17 is a table showing data representative of the difference between the data of FIGS. 15 and 16.
FIG. 18 is a graph showing a rotation variation of the drive roll.

Every time the CPU 41 receives an pulse signal $S1_{RE}$ from the rotary encoder 35, it reads a count of the interval counter 45b, which is driven by the output signal of the pulse oscillator 46, and stores it into the RAM 43 as shown in FIG. 16. When the CPU 41 receives a 0–φ pulse signal $S1_0$ from the rotary encoder 35 as in the case where it receives the 0–φ pulse signal from the calibration rotary encoder 36, and then receives the next pulse signal $S1_{RE}$, it reads a count of the interval counter 45b and stores into the RAM 43 the count as an interval $T_{L1}$ corresponding to the first segment. When receiving an pulse signal $S1_{RE}$ corresponding to the next segment, the CPU 41 similarly reads a count of the counter, and calculates the difference between the present count and the previous count of the interval counter 45b, to thereby measure an interval $T_{L2}$ of that segment and store it into the RAM 43. This task is repeated for one period of the rotary encoder 35.

The number of the pulse signals $S1_{RE}$ outputted during one turn of the calibration rotary encoder 36 is set to be equal to that of the pulse signals $S1_{RS}$ outputted during one turn of the rotary encoder 35. The number of the divided segments used for counting the time intervals of the pulse signal $S2_{RE}$ outputted from the calibration rotary encoder 36 is equal to that of the divided segments for counting the time intervals of the pulse signal $S1_{RE}$ outputted from the rotary encoder 35.

The interval counter 45b is driven by an output signal $S_{OSC}$ at a fixed frequency that is outputted from the pulse oscillator 46. Then, a count of the interval counter 45b exactly indicates an elapsing time.

The CPU 41 computes, for each segment, differences $C_{(N)} = T_{L(N)} - T_{(N)}$ between intervals T of the segments of the calibration rotary encoder 36, which are stored in the RAM 43, and intervals $T_L$ of the segments of the calibration rotary encoder 36, which are also stored in the RAM 43. The results of the computing operations $C_{(N)}$ are stored for each segment in the RAM 43, as shown in FIG. 17.

The work to prepare the correction table is completed. This work is carried out when the color image forming apparatuses are adjusted in a factory before their delivery.

When the color image forming apparatus is operated by a user, the CPU 41 corrects the output signals of the rotary encoder 35 in accordance with the following correction formula, and drives the transfer-member transport belt 20 to turn.

$$f_n = f_s[1 + \alpha\{FILS(1)/T_{ID} - 1\} + \beta\{T_{ID}/(FILD - \Sigma DIFF) - 1\}] \quad (3)$$

The following correction formula (4) may be substituted for the correction formula (3).

$$f_n = f_s[1 + \alpha\{FILS(1)/T_{ID} - 1\}] \times [1 + \beta\{T_{ID}/(FILD - \Sigma DIFF) - 1\}] \quad (4)$$

where $f_n$: segment frequency after the correction $f_S$: standard frequency previously stored in the PROM 42

FILS(1) : interval value computed by weighing, in two steps, the interval values $T_{(N)}$ of the calibration rotary encoder 36, which is stored as the correction table in the RAM 43, over the range from the present segment under correction and ±m number of segments preceding and succeeding to the present segment $$FILS(1) = [h_1 \times \{\Sigma T_{(N-k)}\}/M_1 + h_2 \times \{\Sigma T_{(N-m)}\}/M_2]/M_3$$

In this instance of the present embodiment, k ranges from −2 to +2 and m ranges from −8 to +8 for Σ. M1 is a value obtained by multiplying a weighing coefficient h1 by the number of data to be summed (total of 5; −2 to +2). M2 is a value obtained by multiplying a weighing coefficient h2 by the number of data to be summed (total of 17; −8 to +8). M3 is a value for indicating the number of steps for weighing (2 in this instance).

FILD: a value obtained by computing the difference $(\Sigma T_{ID} - \Sigma T'_{(N)})$ between an ideal value $\Sigma T_{ID}$ of the segment succeeding to the segment under correction, previously stored in the PROM 42 and an interval value $\Sigma T'_{ID}$ read in real time by the rotary encoder 35, and averaging over the range from the segment (N) and an m number of segments preceding to the segment (N). FILD is mathematically expressed by $$FILD = 1/m[\{\Sigma T_{ID} - \Sigma T'_{(N-m+1)}\} + \{\Sigma T_{ID} - \Sigma T'_{(N-m+2)}\} + \{\Sigma T_{ID} - \Sigma T'_{(N-m+3)}\} + \ldots + \{\Sigma T_{ID} - \Sigma T'_{(N-1)}\} + \{\Sigma T_{ID} - \Sigma T'_{(N)}\}]$$

ΣDIFF: accumulated value obtained by averaging the interval values $T_{L(N)}$ and $T_{(N)}$ of the rotary encoders 35 and 36 over the range from the segment (N) and an m number of segments preceding to the segment (N), and accumulating the differences (FILS(2)′−FILS(1)′) between these averaged values from the 0-phase pulse, viz., $$\begin{aligned}\Sigma DIFF &= \Sigma(FILS(2)' - FILS(1)') \, 0 \text{ to } N \\&= \Sigma[1/m\{T_{L(N-m+1)} + T_{L(N-m+2)} + T_{L(N-m+3)} + \\&\quad \ldots + T_{L(N-1)} + T_{L(N)}\} - 1/m\{T_{(N-m+1)} + \\&\quad T_{(N-m+2)} + T_{(N-m+3)} + \ldots + T_{(N-1)} + T_{(N)}\}] \\&\quad (\Sigma \text{ is } 0 \text{ to } N)\end{aligned}$$

$T_{ID}$: ideal calculation value of one segment, stored in advance in the PROM 42, viz., an interval value of one segment in an ideal state that there is no variation in the rotation of the rotary shaft of the drive roll 25.

α: constant in the feed forward part stored in advance in the PROM 42

β: constant in the feed back part stored in advance in the PROM 42

Experiment data and logic analysis based only on the feed forward control show the fact that when α=1, no response delay is present, and hence since a previously known value can be corrected by that amount, the best correction value is obtained. On the basis of the fact, when substituting α=1 into the equation (1), then we have $$f_n = f_S[1 + \alpha\{FILS(1)/T_{ID} - 1\} + \quad (5)$$
$$\beta\{T_{ID}/(FILD - \Sigma DIFF) - 1\}]$$
$$= f_S \times (FILS(1)/T_{ID}) + f_S \times \beta\{T_{ID}/(FILD - \Sigma DIFF) - 1\}$$
$$= f_S \times (FILS(1)/T_{ID}) + \beta \times \{f_S T_{ID}/(FILD - \Sigma DIFF) - f_S\}$$

The equation (5) is used for the correction formula in the present embodiment.

The present embodiment is arranged such that a detected value from the calibration rotary encoder 36, which is a second turn detecting means, is weighted in two steps and the result is averaged, and the drive speed of the transfer-member transport belt 20 is controlled using the averaged data.

In the present embodiment, as described above, the detected value of the calibration rotary encoder 36 is not solely averaged for the drive control, but is divided into two regions, these regions are weighted at different weighing coefficients, and then the results are averaged. A method to weight the detected value of the calibration rotary encoder 36 in two steps and then to average the results is to use a two-stage filter as shown in FIGS. 2 and 3. For the two-step weighing/averaging method, the detected value may be weight in three steps and be averaged as shown in FIGS. 2 and 3. Alternatively, the detected value is successively divided by using a triangle filter, and the divided ones are weighted at different weighing coefficients, and then the results are averaged. In the present embodiment, since the detected value of the calibration rotary encoder 36 is divided in two steps, the corrected value is weighted at "0.5" over the range between ±2 with respect to the present segment of the corrected value, and the resultant values are summed, and then averaged, and further the corrected value is weighted at "0.5" over the range of ±8 to ±8 with respect to the present segment of the corrected value.

FIG. 1 is a diagram showing a process to weight the detected value in two steps and to average the resultant values.

In the figure, reference numeral 50 designates an interval value $T_{(N)}$ of the calibration rotary encoder 36, stored as a correction table in the RAM 43. The interval value $T_{(N)}$ 50 is as shown in FIG. 15. Of the interval value $T_{(N)}$ 50 of the calibration rotary encoder 36 stored in the RAM 43, a total of five data $Z^{-1}$ 51 over the range of ±2 segments with respect to the present segment of the corrected value are read out from the RAM 43. The CPU 41 weights the five data $Z^{-1}$ 51 at h0=h1 ... h4=0.5, and added together (this process denoted as numeral 52), and divides the resultant value by a value M1 for averaging. The value M1 is the product (=2.5) of multiplying the weighing coefficient h0 (=0.5) by the number of data to be added (a total of 5 between −2 to +2, in this instance).

Of the interval value $T_{(N)}$ 50 of the calibration rotary encoder 36 stored in the RAM 43, a total of seventeen data $Z^{-1}$ 53 over the range of ±8 segments with respect to the present segment of the corrected value are read out from the RAM 43. The CPU 41 weights the seventeen data $Z^{-1}$ 53 at h0=h1 ... h16=0.5, and added together (this process denoted as numeral 54), and divides the resultant value by a value M2 for averaging. The value M2 is the product (=8.5) of multiplying the weighing coefficient h0 (=0.5) by the number of data to be added (a total of 17 between −8 to +8, in this instance).

The data 55 and 56, obtained by the two-step weighing/averaging process, are added together (this process denoted as numeral 57) by the CPU 41, and the resultant value is divided by the number M3 (=2) of data to be added. As a result, data FILS(1) 58 is produced as one of the control data.

In the case where the weighing coefficient is set at "0.5", in carrying out the weighing/averaging process by the CPU 41, a process of multiplying the value by the weighing coefficient 0.5 can be carried out in a manner that given data expressed by the binary system are successively added, and then the added data is shifted by 1 bit. Thus, the computing process is very simple, and is suitable for a high speed drive control. This is not limited to the case where the weighing coefficient is "0.5". In a case where the weighing coefficient is 0.25 as in the three-stage filter as shown, the computing process of multiplying the corrected value by the weighing coefficient of "0.25" can be carried out in a manner that given binary data are successively added, and then the added data is shifted two bits. Also in this case, the useful effect comparable with that achieved by the previous case can be obtained.

If necessary, the data FILD and/or $\Sigma$DIFF may be weighted and then averaged.

With such a construction, the rotary-body drive control system according to the present invention performs a drive control of the transfer-member transport belt in the following way. In the color image forming apparatus, as shown in FIG. 9, toner images of black, yellow, magenta and cyan are successively formed on the surfaces of the photoreceptor drums 10K, 10Y, 10M and 10C, and these color toner images are successively transferred onto a recording paper 15 that is held on the transfer-member transport belt 20. In this case, the drive roll 25 for turning the transfer-member transport belt 20 is controlled in its drive state in the following way.

At the start of forming a color image, as shown in FIG. 11, the CPU 41 drives the drive motor 30 at the standard frequency $f_S$, thereby to turn the drive roll 25, which is for driving the transfer-member transport belt 20. After a 0-phase pulse $S1_0$ from the rotary encoder 35 is detected, the CPU 41 computes a correction frequency $f_n$ in the next segment (N+1), by the formula (5), on the basis of the interval values $T_{(N)}$ and $T_{L(N)}$ stored in the correction table and an interval value $T'_{(N)}$ outputted from the calibration rotary encoder 36, and outputs the result of the computing operation to the drive motor 30.

The correction of the drive frequency by the formula (5) is continually carried out but it may be carried out only when it is required.

The CPU 41 produces the data of the drive frequency $f_n$ after it is corrected for transmission to the interval counter 45. The interval counter 45 counts a pulse signal generated by the pulse oscillator 46. Every time a count of the counter reaches the after-corrected drive frequency $f_n$, the interval counter 45 outputs a drive pulse signal $S_{DP}$. As a result, the drive roll 25 is turned by the drive pulse signal $S_{DP}$ at the after-corrected drive frequency $f_n$, which is supplied to the drive motor 30 through the drive-motor driver 47.

When there is no variation in the rotation of the drive roll 25, the values of the FILS(1) and FILD are equal to the value $T_{ID}$, and $\Sigma$DIFF is 0. For the formula (5), $f_n=f_S$. The after-corrected drive frequency $f_n$ is equal to the standard frequency $f_S$, as a matter of course.

In an actual drive roll 25, a speed variation corresponding to one turn of the drive roll 25 and its harmonics are generated in the transfer-member transport belt 20. Further, a speed variation corresponding to the number of teeth of the final gear 34 is also generated in the same. As a result, even when the drive motor 30 is driven at the standard frequency $f_S$, a rotation speed of the drive roll 25 is not equal to a predetermined value. Then, the CPU 41 controls a rotating state of the drive motor 30 according to the formula (5), thereby preventing the drive roll 25 from varying in rotation. Let us consider a case where an interval value in the K-th segment, which is to be corrected, stored in the correction table, is long, that is, an angular speed of the drive roll 25 is slow in the K-th segment when the drive motor 30 is driven at a fixed angular speed. In this case, an interval value $T_{(K)}$ in that segment stored in the correction table is larger than the value $\Sigma T_{ID}$. Under this condition, the after-corrected drive frequency $f_n$ becomes high in the following way. In the formula (5), FILS(1), FILD AND $\Sigma$DIFF take the following values.

As already referred to, FILS(1) is expressed by $[h_1 \times \{\Sigma T_{(N-k)}\}/M_1 + h_2 \times \{\Sigma T_{(N-m)}/M_2\}/M_3$. Then, when the interval value $T_{(K)}$ in the K-th segment to be corrected is large, the value FILS(1) is larger than the value $T_{ID}$. Accordingly, in the formula (5), (FILS(1)/$T_{ID}$) is larger than 1.

In the correction formula (5), FILD is expressed by $1/m[\{T_{ID}-\Sigma T'_{(N-m+1)}\}+\{\Sigma T_{ID}-\Sigma T'_{(N-m+2)}\}+\{\Sigma T_{ID}=\Sigma T'_{(N-m+3)}\}+ \ldots +\{\Sigma T_{ID}-\Sigma T'_{(N-1)}\}+\{\Sigma T_{ID}-\Sigma T'_{(N)}\}]$. The value is obtained by averaging the difference between the ideal value $\Sigma T_{ID}$ in the segment subsequent to the current segment and the interval value $\Sigma T'_{(N)}$ read in real time by the rotary encoder 35. Therefore, if the rotation variation of the drive roll 25 is corrected through the correction of the value FILS(1), the value FILD is theoretically equal to the value as the sum of the value $T_{ID}$ and the detection error of the rotary encoder 35. Here, the detection error of the rotary encoder 35 is the value $\Sigma$DIFF itself. Thence, in the second term of the correction formula (5), $\beta \times \{f_s \cdot T_{ID}/(FILD-\Sigma DIFF)-F_S\}$, (FILD–$\Sigma$DIFF) is $T_{ID}$ and the second term is 0. $\beta$ in the correction formula (5) is set at a proper value.

As a result, $f_n$ in the correction formula (5) is larger than the value $f_s$, viz., the correction frequency $f_n$ is high. With this, control is made so as to make the angular speed of the rotation of the drive roll 25, driven by the drive motor 30, constant. The peripheral speed of the transfer-member transport belt 20 is constant.

As the result of aging, temperature variation, and the like, expansion and reduction in configuration and dimensions affect influences on fluctuation in tooth grooves of the gears and mesh errors for all the pitches, so that an eccentric component varies. When an angular speed in the K-th segment is increased by the aging, temperature variation, and the like, viz., the interval value in the K-th segment to be corrected in the correction table is short, an interval value $T_{(K)}$ detected in real time in that segment by the rotary encoder 35 becomes smaller than the value $T_{ID}$. As a result, the correction frequency $f_n$ becomes low in the following way. In the correction formula (5), the values FILS(1), FILD and DIFF are as described hereinunder.

As described above, FILD is expressed by $1/m[\{\Sigma T_{ID}-\Sigma T'_{(N-m+1)}\}+\{\Sigma T_{ID}-\Sigma T'_{(N-m+2)}\}+\{\Sigma T_{ID}-\Sigma T'_{(N-m+3)}\}+ \ldots +\{\Sigma T_{ID}-\Sigma T'_{(N-1)}\}+\{\Sigma T_{ID}-\Sigma T'_{(N)}\}]$. Accordingly, if the interval value $T'_{(K)}$ detected in real time by the rotary encoder 35 is smaller than the value $T_{ID}$, the value FILD is larger than the value $T_{ID}$. Thence, in the second term of the correction formula (5), $\beta \times \{f_s \cdot T_{ID}/(FILD-\Sigma DIFF)-f_S\}$, (FILD–$\Sigma$DIFF) is larger than $T_{ID}$ and $f_s \cdot T_{ID}/(FILD-\Sigma DIFF)-f_S$ is smaller than standard frequency $f_S$. As a result, the second term of the correction formula (5) takes a small value of minus sign since $f_S$ is not greatly different from $f_s \cdot T_{ID}/(FILD-\Sigma DIFF)$ $-f_S$. As a result, the correction frequency $f_n$ is low.

FILS(1) is not for correcting errors caused by aging, temperature variation and the like, but for correcting errors proper to the drive system of the drive roll 25. This FILS(1) takes a given value as described above.

Thus, $f_n$ in the correction formula (5) is smaller than $f_S$, viz., it is low. With this, control is made so as to make the angular speed of the rotation of the drive roll 25, driven by the drive motor 30, constant. The peripheral speed of the transfer-member transport belt 20 is constant.

As described above, the present embodiment can correct not only a variation of the angular speed of the transfer-member transport belt 20, but also a dynamic angular speed variation caused by aging, temperature variation, and the like.

The interval values outputted from the rotary encoders 35 and 36 are corrected after those are averaged by the CPU 41. As for the information of a variation of the angular speed of the drive roll 25 to be stored in the RAM 43, if the number of divided angular speeds is greatly increased, there is eliminated such an unwanted situation that the interval values outputted form the rotary encoders 35 and 36 are averaged and a variation component by the correction grows into a vibration applying source for a mechanical system ranging from the drive motor 30 to the rotary shaft of the drive roll 25, and the mechanical system oscillates or an amplitude of the natural frequency increases.

The calibration rotary encoder 36 is used only at the adjustment in factory. Before the product or the color image forming apparatus is delivered, the calibration rotary encoder 36 is removed from the apparatus. Therefore, use of the calibration rotary encoder 36 does not increase the cost to manufacture the apparatus, but realizes a high precision drive control of the transfer-member transport belt.

In the present embodiment, when the color image forming apparatus operates, the CPU 41 reads rotation speed information gathered by the calibration rotary encoder 36 from the RAM 43, weights the readout information in two steps for each segment, and averages the resultant information, and controls the drive of the transfer-member transport belt 20 on the basis of the averaged rotation speed information by using the equation (5) as the correction formula. With this construction, during the belt drive control operation, if the rotation angular speed of the transfer-member transport belt 20 varies, the control means reads rotation speed information gathered by the calibration rotary encoder 36 from the RAM 43, weights the readout information for each segment, averages the information, and controls the drive of the transfer-member transport belt 20 according to the averaged rotation speed information. Therefore, the process on which rotary body drive control system of the present invention is based can more reduce the adverse effect from the segments apart from the divided segment under control than the conventional moving averaging process. Further, the process of the invention can reduce a rotation variation in high frequency regions, which is increased in the conventional moving averaging variation.

To be more specific, in the present invention, the CPU 41 executes the addition process in two stages, performs the weighing of the two-stage filter as shown in FIGS. 2 and 3 by the two-stage addition process. Therefore, the rotation variation in high frequency regions, that is increased in the conventional moving averaging process, can be reduced. The reason for this will be described hereinunder.

The characteristic of the two-stage filter follows.

When an input signal $X(n)$ is inputted to this filter, an output signal $Y(n)$ thereof is given by $$Y(n)=(\tfrac{1}{2})\times(\Sigma X'_{(N-k)})+(\tfrac{1}{2})\times(\Sigma X'_{(n-m)})$$

In the above equation, for $\Sigma$, $k=-2$ to $+2$, and $m=-8$ to $+8$. The output signal $Y(n)$ is averaged by dividing the whole $Y(n)$ by a given coefficient, not shown.

The equation describes the sum of two moving averaging filters. Then, let us analyze the first term of the equation. The first term is $$Y1(n) = (\tfrac{1}{2}) \times (\Sigma X'_{(n-k)})$$

The frequency transfer function $H(Z)$ of this is $$H(Z) = (\tfrac{1}{2}) \times (Z^2 + Z^1 + 1 + Z^{-1} + Z^{-2}); \ h0 = \tfrac{1}{2}$$

The frequency response is given, when substituting $e^{j\omega t}$ into $Z$.

$$H(n) = (\tfrac{1}{2}) \times (\cos(2\omega t) + \cos(\omega t) + 1)$$

Similarly, the second term of the equation is $$Y2(n) = (\tfrac{1}{2}) \times (\Sigma X'_{(n-m)}); \ h0 = \tfrac{1}{2}$$

Here, for $\Sigma$, $m=-8$ to $8$. The frequency transfer function $H(Z)$ is given $$H(Z) = (\tfrac{1}{2}) \times (Z^8 + Z^7 + Z^6 + Z^5 + Z^4 + Z^3 + Z^2 + Z^1 + 1 + Z^{-1} + Z^{-2} + Z^{-3} + Z^{-4} + Z^{-5} + Z^{-6} + Z^{-7} + Z^{-8})$$

The frequency response is given, when substituting $e^{j\omega t}$ into $Z$.

$$H(n) = (\tfrac{1}{2}) \times (\cos(8\omega t) + \ldots + \cos(\omega t) + 1)$$

Thence, the final transfer function is $$Y(n)/X(n) = H(n) = (\tfrac{1}{2}) \times (\cos(8\omega t) + \ldots + 2\cos(2\omega t) + 2\cos(\omega t) + 2)$$

A graphical representation of the frequency transfer function of the two-stage filter is as shown in FIG. 4. As seen from FIG. 4, in this filter, the input/output ratio does not take a minus value in the high frequency region from 50 to 80 Hz. Therefore, a rotation variation in the high frequency region is not amplified. Further, a variation of the input/output ratio is minimized in other high frequencies. Thus, the rotation variation can be reduced while it is increased in the conventional process.

As a result, the transfer speed of the transfer-member transport belt 20 is constant, and the speeds of the transfer section of the four photoreceptor drums 1Y, 1M, 1C and 1B are also constant. Therefore, the out-of-registration among the four transfer sections is minimized. For example, a position error $\Delta x$ after the correction is very small as shown in FIG. 18.

The position error illustrated was measured on the basis of the output signal of the rotary encoder 35 by using an instrument in the following manner.

The output signal of the rotary encoder 35 is F/V converted, and A/D converted, and the result is sampled at proper periods, and stored in a memory. The digital values stored are averaged, and the differences between the digital values and the averaged value are computed. The computed values are speed difference values. Then, these are integrated with respect to time, thereby obtaining a position error.

Figure 19:
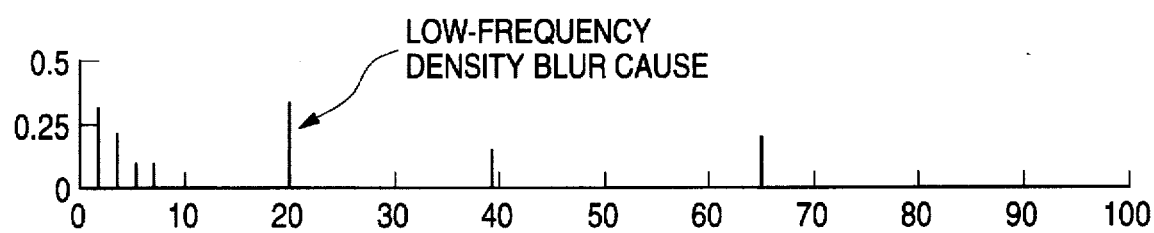
FIG. 19 is a graph showing a frequency component of a rotation variation of the drive roll by a conventional art.
Figure 20:
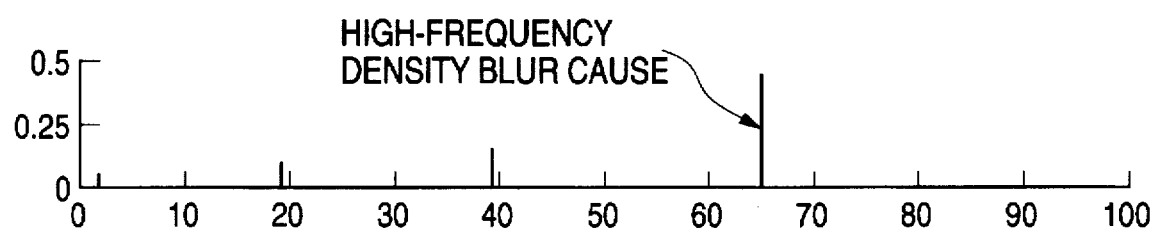
FIG. 20 is a graph showing a frequency component of a rotation variation of the drive roll by another conventional art.

By convention, a feedback control alone is used for controlling the speed of the transfer-member transport belt 20. A speed variation with respect to frequencies when only the feedback control is used is graphically illustrated in FIG. 19. As seen from the graph, a portion that cannot perfectly be erased is present in low frequencies. Therefore, good picture quality cannot be expected. FIG. 20 shows the result of speed variation vs. frequencies when a feed forward control using the moving averaging filter is additionally used. Also in this case, a considerable effect for picture quality improvement is secured in low frequencies, but in high frequencies the speed variation is greater than when only the feedback control is used. Another cause to deteriorate the picture quality is created. This is due to the amplifying characteristic already referred to. In this respect, this approach is unsatisfactory in improving the picture quality.

Figure 21:
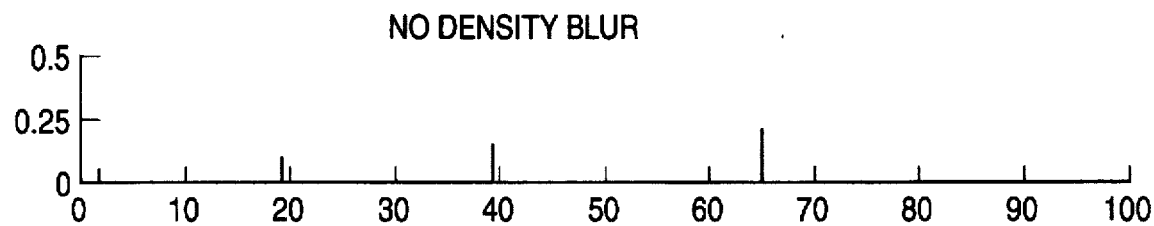
FIG. 21 is a graph showing a frequency component of a rotation variation of the drive roll by the present invention.

FIG. 21 is a graph showing the result of speed variation rs. frequencies when the filter according to the present invention is used. As seen, the speed variation is not amplified but reduced in both low and high frequency regions. The graph clearly shows that the present invention succeeds in providing a satisfactory improvement of the picture quality.

Figure 22:
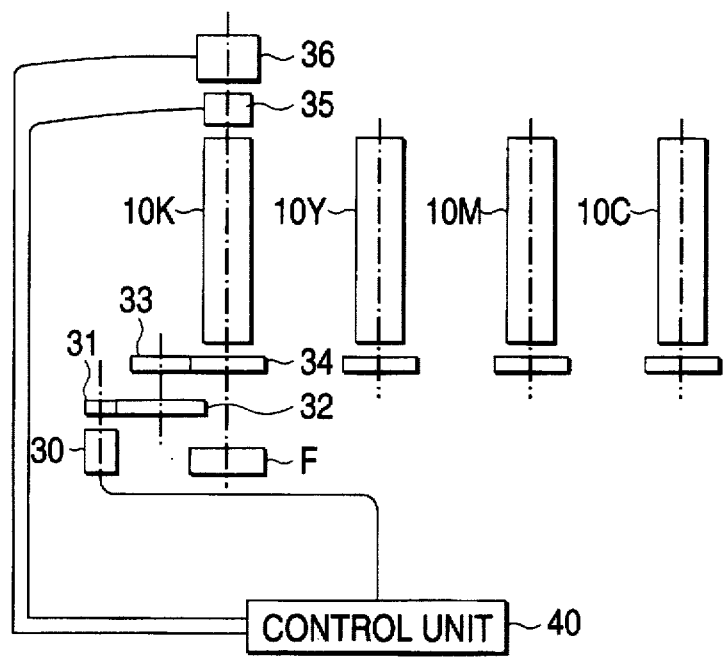
FIG. 22 is a diagram schematically showing a drive mechanism for photoreceptor drums according to a second embodiment of the present invention.

FIG. 22 is a diagram schematically showing a drive mechanism for photoreceptor drums according to a second embodiment of the present invention. Like or equivalent portions are designated by like reference numerals in the first embodiment, for simplicity. The second embodiment is arranged so as to control the drive for rotation of the photoreceptor drums, not the transfer-member transport belt.

In the instant embodiment, the photoreceptor drums 10K, 10Y, 10M and 10C are driven for rotation at the surface speed of 160 mm/sec. The 2-phase stepping drive motor 30 rotates 14.6 turns per second when it is driven at the fundamental drive frequency of 2,920 Hz. The rotary shaft of each photoreceptor drum is turned at a reduction ratio of 1/24. Each of the photoreceptor drums 10K, 10Y, 10M and 10C to be driven is specified: the load is 5 Kgf, the diameter is 84 mm, and the width is 340 mm. During the rotation of the photoreceptor drum, in connection with the reduction ratio, a speed variation corresponding to one turn of the rotary shaft of the photoreceptor drum, together with its harmonics, is generated on the drum surface. Further, it generates a speed variation component corresponding to the number of teeth of the final gear 34. These speed variation components are also generated because the tooth of the final gear 34 is not profiled in the form of a perfect involute curve. These speed variation components are measured in the form of a variation of the pulse intervals of a pulse signal outputted from the rotary encoder 35, attached to the rotary shaft of the photoreceptor drum, and sampled. Normally, it is observed in a state that the frequency at approximately 217 Hz varies at 10% p—p. The frequency is dissolved into frequency components and these are observed. Accordingly, when the analysis by an FFT method is applied to them, it is seen that the speed variation components of the frequencies are caused.

FIG. 22 shows a mechanism for driving the photoreceptor drums 10K, 10Y, 10M and 10C for rotation.

In the figure, the photoreceptor drums 10K, 10Y, 10M and 10C are each driven for rotation by a drive motor 30 as a 2-phase stepping motor, a first gear 31 fastened to a drive shaft of the drive motor 30, a second gear 32 in mesh with the first gear 31, a third gear 33 fastened to the same shaft of the second gear 32, and a photoreceptor gear 34 which is fastened to the rotary shaft of each of the photoreceptor drums 10K, 10Y, 10M and 10C, and is in mesh with the third gear 33. A flywheel 35 as an inertia body is attached to the rotary shaft of each of the photoreceptor drums 10K, 10Y, 10M and 10C.

A rotary encoder 35 and a rotary encoder 36 for calibration are attached to the rotary shaft of each of the photoreceptor drums 10K, 10Y, 10M and 10C. The rotary encoders 35 and 36 are used for detecting an angular speed of each of the photoreceptor drums 10K, 10Y, 10M and 10C. The rotary encoders 35 and 36 are connected to a control unit 40, which is connected to the drive motor 30. The rotary encoder 35, which is of a relatively low precision type, produces 180 or 360 pulses per turn, for example. The calibration rotary encoder 36, which is of a relatively high precision, produces over ten thousands pulses per turn. The calibration rotary encoder 36 is attached to the rotary shaft of each of the photoreceptor drums 10K, 10Y, 10M and 10C when the color image forming apparatus is adjusted in factory, and is removed therefrom before it is delivered.

Before the drive control according to the instant embodiment, in the drive mechanism for the photoreceptor drum, a rotation angular speed of the rotary shaft of each photoreceptor drum is varied by various causes, for example, an eccentricity of the rotary shaft of each of the photoreceptor drums 10K, 10Y, 10M and 10C, and meshing errors of the drive gears 31, 32, 33 and 34, even if an instruction frequency to the drive motor 30 for driving the photoreceptor drums 10K, 10Y, 10M and 10C for turn is set at a fixed frequency. The speed variation causes a position error (a deviation from the ideal position) in the rotation of each photoreceptor drums 10K, 10Y, 10M and 10C, as shown in FIG. 4.

As shown, before the drive control for the photoreceptor drums, peaks of the amplitude appear at points near to the frequency $f_i$, the resonance frequency $f_n$ of the system, and high frequencies owing to the drive gear. The variation of the rotation angular speed of each of the photoreceptor drums appear in the form of color out-of-registration and color irregularity in the color images, which are successively transferred onto a recording paper 10.

The variation of the angular speed of each photoreceptor drum contains a variation of low frequencies of an eccentric component generated at periods each equal to one turn of the photoreceptor drum, a variation of the intermediate frequency corresponding to the resonance frequency $f_n$ of the system, a variation high frequencies caused by the drive gear, and the like.

Figure 23:
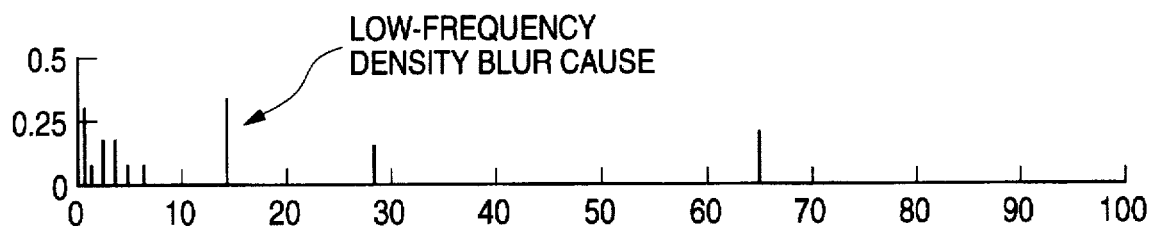
FIG. 23 is a graph showing a frequency component of a rotation variation of the photoreceptor drum by a conventional art.
Figure 24:
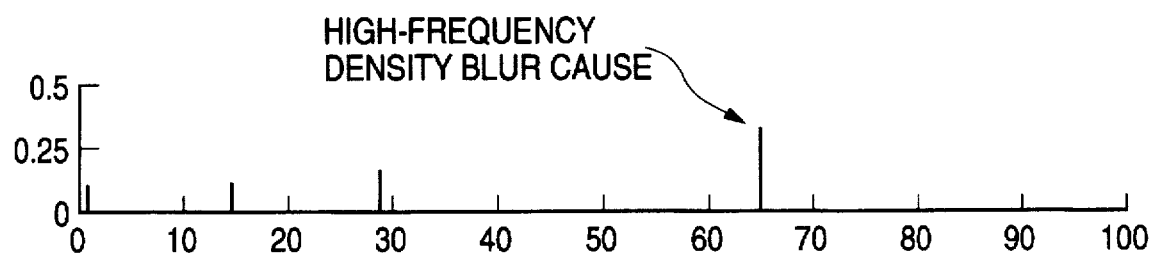
FIG. 24 is a graph showing a frequency component of a rotation variation of the photoreceptor drum by another conventional art.

In the instant embodiment, as in the first embodiment, a rotating state of the drive motor 30 for driving the photoreceptor drums 10K, 10Y, 10M and 10C for turn is controlled according to the correction formula (5). Therefore, a rotation variation of each of the photoreceptor drums 10K, 10Y, 10M and 10C can be reduced as described below. By convention, a feedback control alone is used for controlling the speed of each of the photoreceptor drums 10K, 10Y, 10M and 10C. A speed variation with respect to frequencies when only the feedback control is used is graphically illustrated in FIG. 23. As seen from the graph, a portion that cannot perfectly be erased is present in low frequencies. Therefore, good picture quality cannot be expected. FIG. 24 shows the result of speed variation vs. frequencies when a feed forward control using the moving averaging filter is additionally used. Also in this case, a considerable effect for picture quality improvement is secured in low frequencies, but in high frequencies the speed variation is greater than when only the feedback control is used. Another cause to deteriorate the picture quality is created. This is due to the amplifying characteristic already referred to. In this respect, this approach is unsatisfactory in improving the picture quality.

Figure 25:
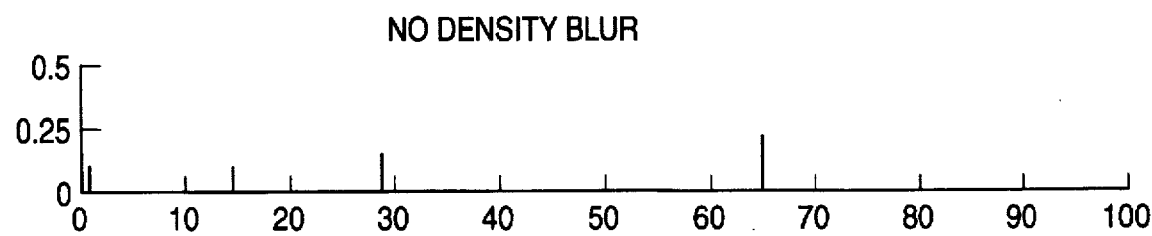
FIG. 25 is a graph showing a frequency component of a rotation variation of the photoreceptor drum by the present invention.

FIG. 25 is a graph showing the result of speed variation vs. frequencies when the filter according to the present invention is used. As seen, the speed variation is not amplified but reduced in both low and high frequency regions. The graph clearly shows that the present invention succeeds in providing a satisfactory improvement of the picture quality.

Other construction and operations of the second embodiment are substantially the same as those of the first embodiment, and hence no further description thereof will be given.

In the instant embodiment, the flywheel 35 as an inertia body is attached to the rotary shaft of each of the photoreceptor drums 10K, 10Y, 10M and 10C. Provision of these flywheels prevents variations of high frequency components owing to gear teeth, for example, from being caused, and hence color irregularity and the like from occurring in the image.

These high frequency component variations can be suppressed by using properly selected flywheels 35 as inertia bodies.

By our experiments, it was confirmed that the high frequency components can be reduced and the correction control effectively operates when the flywheels 35 is $$J_L \leq 0.5 \text{ Kg.cm.s}^2$$

where $J_L$: inertia moment.

Figure 26:
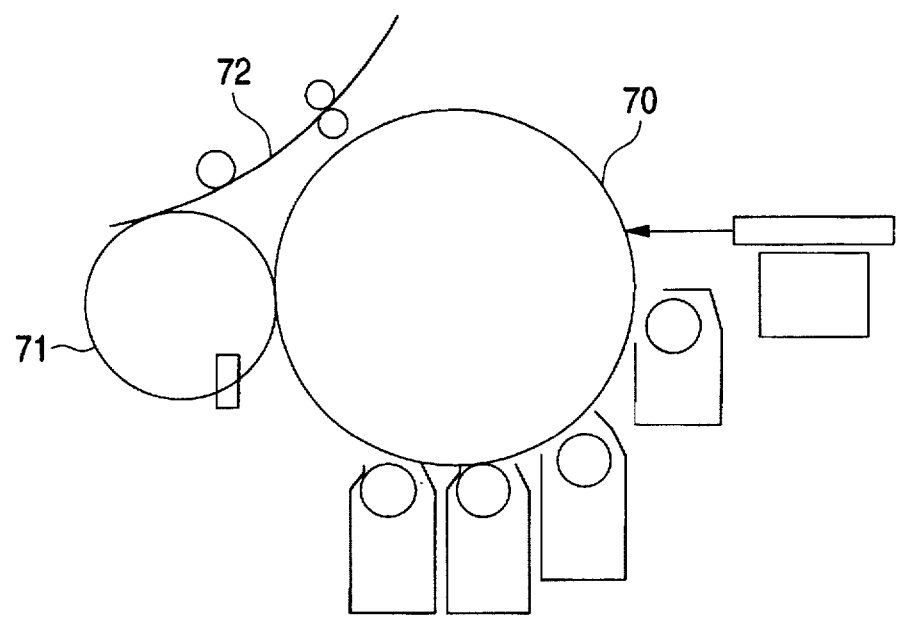
FIG. 26 is a diagram showing a color image forming apparatus into which a rotary body drive control system according to a third embodiment of the present invention may be incorporated.

FIGS. 26 to 29 show third to sixth embodiments of the present invention. Like or equivalent portions are designated by like reference numerals in the first embodiment, for simplicity. The embodiment of FIG. 26 is arranged such that toner images of four colors are successively formed on a photoreceptor drum 70, and these toner images are successively transferred onto a recording paper 72 held on a transfer drum 71, thereby forming a color image. At least one of the photoreceptor drum 70 and the transfer drum 71 is controlled by the rotary body drive control system of the present invention.

Figure 27:
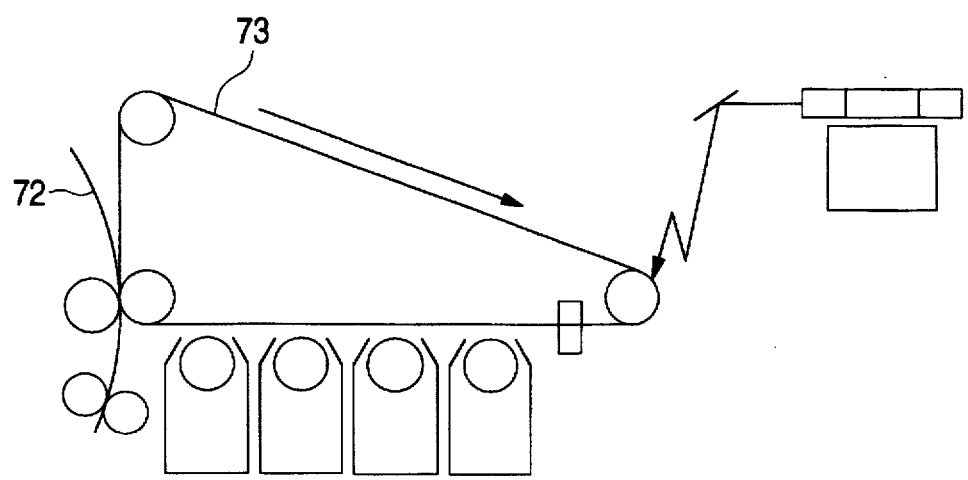
FIG. 27 is a diagram shaping a color image forming apparatus into which a rotary body drive control system according to a fourth embodiment of the present invention may be incorporated.

The embodiment shown in FIG. 27 is arranged such that toner images of four colors are formed on a belt-like photoreceptor 73 in a superimposed fashion, and these toner images are transferred onto a recording paper 72 at one time, thereby forming a color image. The belt-like photoreceptor 73 is controlled by the rotary body drive control system of the present invention.

Figure 28:
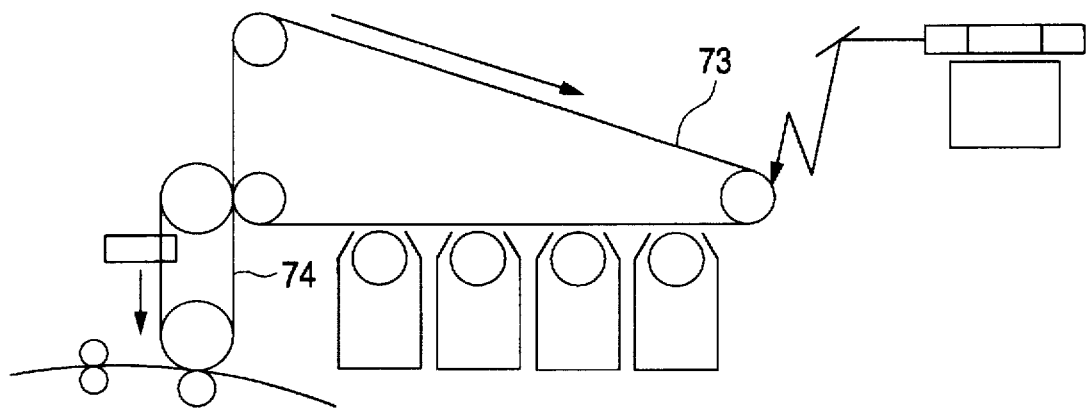
FIG. 28 is a diagram showing a color image forming apparatus into which a rotary body drive control system according to a fifth embodiment of the present invention may be incorporated.

The embodiment shown in FIG. 28 is arranged such that toner images of four colors are formed on a belt-like photoreceptor 73 in a superimposed fashion, these toner images are transferred onto a medium transfer belt 74 at one time, and then are transferred a recording paper 72 at one time, thereby forming a color image. At least one of the belt-like photoreceptor 73 and the medium transfer belt 74 is controlled by the rotary body drive control system of the present invention.

Figure 29:
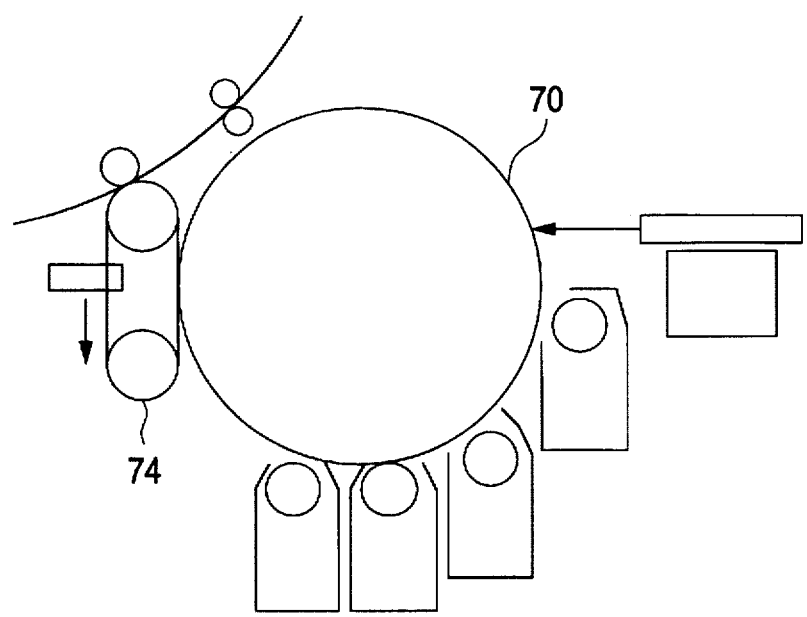
FIG. 29 is a diagram showing a color image forming apparatus into which a rotary body drive control system according to a sixth embodiment of the present invention may be incorporated.
Figure 30:
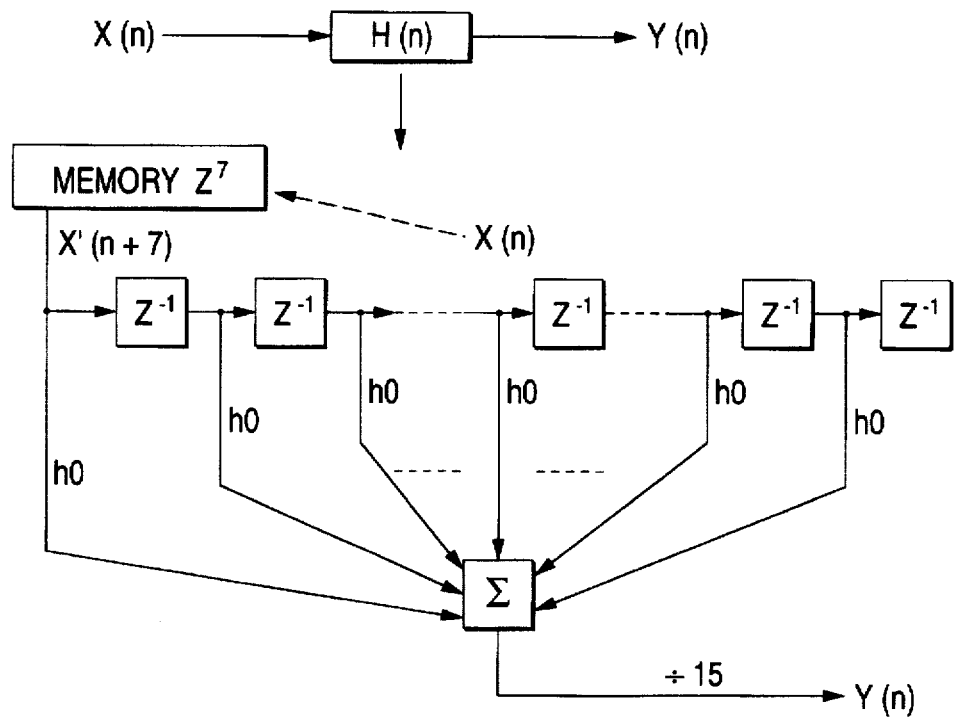
FIG. 30 is a diagram showing a conventional "moving averaging process"
Figure 31:
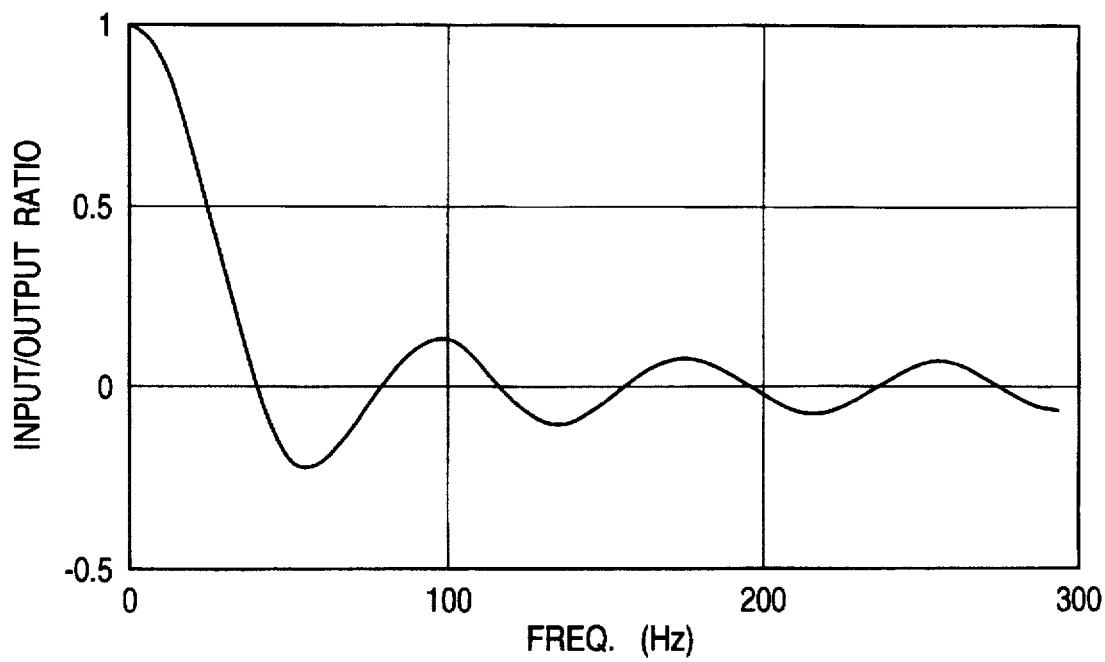
FIG. 31 is a graph showing a filter characteristic of a window function used for the control means.

The embodiment of FIG. 29 is arranged such that toner images of four colors are successively formed on a photoreceptor drum 70, these toner images are successively transferred onto a medium transfer belt 74, and then are transferred onto a recording paper 72, thereby forming a color image. At least one of the photoreceptor drum 70 and the medium transfer belt 74 is controlled by the rotary body drive control system of the present invention.

Also in those embodiments, the remaining constructions are substantially the same as the corresponding one of the first embodiment. Hence, no further description thereof will be given. While the present invention has been applied to an image transfer system and an image forming system, it may be applied to an image reader. In this case, a drive pulley for linearly driving a scanner containing a CCD sensor corresponds to the rotary body.

As seen from the foregoing description, in a high precision speed control of a rotary body, no oscillation is caused in the rotary body. A rotation variation of the rotary body, which is caused in low frequencies, can effectively be reduced at low cost. The present invention realizes a rotary body drive control system applicable to quality image devices free from density irregularity, and the like.

While some specific embodiments have been described, it should be understood that the present invention is not limited to those embodiments, but may variously be modified, altered and changed within the scope of the present invention.

What is claimed is:

1. A rotary body drive control system for controlling the drive of a rotary body used in an image device, comprising:

rotation detecting means for detecting a rotation speed of the rotary body;

dividing means for dividing rotation speed information, detected by said rotation detecting means into segmental information;

storage means for storing the rotation speed information, detected by the rotation detecting means when drive means for driving the rotary body for rotation is turned at a fixed speed, for each of the divided segments of the rotation speed; and control means for controlling the drive of the rotary body in accordance with corrected rotation speed information that is formed by weighing the rotation speed information of each divided segment stored in the storing means, and averaging the weighted rotation speed information, when the image device is operated.

2. The rotary body drive control system according to claim 1, wherein the control means includes a plural number of adder means for adding the rotation speed information of the rotation detecting means for a predetermined number of divided segments, and wherein the control means weights the addition results of the adder means differently, and averages the weighted addition results.

3. The rotary body drive control system according to claim 1, wherein said rotary body comprises one of a photoreceptor drum, a photoreceptor belt drive roll, a medium transfer belt drive roll, a transfer-member transport belt drive roll, a continuous paper transport drive roll, an image reader drive shaft, an ink jet head drive shaft, a paper feeder and an image fixing unit.

4. The rotary body drive control system according to claim 1, further comprising home position detecting means for detecting a home position of said rotary body, the home position indicating a reference rotation position of said rotary body, wherein said rotation detecting means divides the rotation speed information into segmental information with reference to the home position of the rotary body.

5. The rotary body drive control system according to claim 1, wherein said rotation detecting means comprises one of an optical transmission type sensor, a reflection type sensor, and means utilizing one of magnetic, ultrasonic wave, projection, and indent.

6. The rotary body drive control system according to claim 1, wherein said rotation detecting means comprises one of a rotary encoder and tacho generator.

* * * * *